US009032407B2

(12) United States Patent
Saito

(10) Patent No.: US 9,032,407 B2
(45) Date of Patent: May 12, 2015

(54) MULTIPROCESSOR SYSTEM, MULTIPROCESSOR CONTROL METHOD, AND MULTIPROCESSOR INTEGRATED CIRCUIT

(75) Inventor: Masahiko Saito, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 506 days.

(21) Appl. No.: 13/002,832

(22) PCT Filed: May 20, 2010

(86) PCT No.: PCT/JP2010/003388
§ 371 (c)(1),
(2), (4) Date: Jan. 6, 2011

(87) PCT Pub. No.: WO2010/137262
PCT Pub. Date: Dec. 2, 2010

(65) Prior Publication Data
US 2011/0119677 A1     May 19, 2011

(30) Foreign Application Priority Data

May 25, 2009    (JP) ................................. 2009-124867

(51) Int. Cl.
    *G06F 15/76*        (2006.01)
    *G06F 15/00*        (2006.01)
(Continued)

(52) U.S. Cl.
    CPC ............ *G06F 9/5083* (2013.01); *G06F 9/5094* (2013.01); *Y02B 60/142* (2013.01)

(58) Field of Classification Search
None
See application file for complete search history.

(56) References Cited

U.S. PATENT DOCUMENTS 5,170,482 A    12/1992   Shu
5,613,136 A *   3/1997   Casavant et al. ................ 712/28
5,630,129 A *   5/1997   Wheat ............................ 718/105
(Continued)

FOREIGN PATENT DOCUMENTS

CN       1503150       6/2004
CN       1910554       2/2007
(Continued)

OTHER PUBLICATIONS

Lin et al., "The Gradient Model Load Balancing Method, " IEEE Trans. on Software Eng. (Jul. 1987).*
(Continued)

*Primary Examiner* — Lewis A Bullock, Jr.
*Assistant Examiner* — Kevin X Lu
(74) *Attorney, Agent, or Firm* — Wenderoth, Lind & Ponack, L.L.P.

(57) ABSTRACT

In a multiprocessor system, in general, a processor assigned with a larger amount of tasks is apt to perform a larger amount of communication with other processors assigned with tasks, than a processor assigned with a smaller amount of tasks. Thus in order for each processor to be able to perform the routing process efficiently, tasks are assigned such that, when there are a first processor and a second processor, the number of processors each assigned with one or more tasks and directly connected with the second processor being smaller than the number of processors each assigned with one or more tasks and directly connected with the first processor, the amount of tasks assigned to the first processor is equal to or larger than the amount of tasks assigned to the second processor.

14 Claims, 24 Drawing Sheets

(51) Int. Cl.
*G06F 9/46* (2006.01)
*G06F 9/50* (2006.01)

(56) References Cited

U.S. PATENT DOCUMENTS

| | | | |
|---|---|---|---|
| 6,141,762 A | 10/2000 | Nicol et al. | |
| 7,249,179 B1* | 7/2007 | Romero et al. | 709/226 |
| 7,856,544 B2* | 12/2010 | Schenfeld et al. | 712/29 |
| 7,877,755 B2* | 1/2011 | Steinder et al. | 718/105 |
| 8,275,313 B1* | 9/2012 | Myers et al. | 455/41.2 |
| 2003/0135621 A1* | 7/2003 | Romagnoli | 709/226 |
| 2004/0098718 A1 | 5/2004 | Yoshii et al. | |
| 2004/0268278 A1 | 12/2004 | Hoberman et al. | |
| 2005/0188372 A1 | 8/2005 | Inoue et al. | |
| 2005/0188373 A1 | 8/2005 | Inoue et al. | |
| 2005/0246569 A1* | 11/2005 | Ballew et al. | 714/4 |
| 2006/0123365 A1 | 6/2006 | Hoberman et al. | |
| 2006/0167966 A1* | 7/2006 | Kumar et al. | 709/201 |
| 2006/0190942 A1 | 8/2006 | Inoue et al. | |
| 2007/0198971 A1* | 8/2007 | Dasu et al. | 717/140 |
| 2007/0226686 A1* | 9/2007 | Beardslee et al. | 717/109 |
| 2007/0255929 A1 | 11/2007 | Kasahara | |
| 2008/0249757 A1* | 10/2008 | Berstis et al. | 703/13 |
| 2008/0276105 A1 | 11/2008 | Hoberman et al. | |
| 2008/0282062 A1 | 11/2008 | Montvelishsky et al. | |
| 2008/0301482 A1 | 12/2008 | Goff | |
| 2009/0003204 A1* | 1/2009 | Okholm et al. | 370/230 |
| 2009/0031316 A1* | 1/2009 | Richoux | 718/102 |
| 2009/0083425 A1* | 3/2009 | Bozak et al. | 709/226 |
| 2009/0083746 A1* | 3/2009 | Katsumata | 718/103 |
| 2009/0138883 A1* | 5/2009 | McLean | 718/104 |
| 2009/0152948 A1 | 6/2009 | Hoberman et al. | |
| 2009/0199191 A1* | 8/2009 | Arimilli et al. | 718/103 |
| 2009/0199200 A1* | 8/2009 | Arimilli et al. | 718/105 |
| 2010/0138810 A1* | 6/2010 | Komatsu et al. | 717/107 |
| 2010/0146310 A1 | 6/2010 | Kasahara et al. | |
| 2011/0216773 A1* | 9/2011 | Vegesna et al. | 370/395.4 |
| 2011/0231849 A1* | 9/2011 | Saha et al. | 718/102 |
| 2011/0276977 A1* | 11/2011 | van Velzen et al. | 718/104 |

FOREIGN PATENT DOCUMENTS

| | | |
|---|---|---|
| CN | 101201622 | 6/2008 |
| CN | 101320363 | 12/2008 |
| CN | 101393530 | 3/2009 |
| JP | 6-75786 | 3/1994 |
| JP | 2000-66776 | 3/2000 |
| JP | 2001-92661 | 4/2001 |
| JP | 2003-108260 | 4/2003 |
| JP | 2006-293768 | 10/2006 |
| JP | 2007-501478 | 1/2007 |
| JP | 2007-188523 | 7/2007 |
| JP | 2008-77563 | 4/2008 |
| JP | 2009-64411 | 3/2009 |

OTHER PUBLICATIONS

Schwederski et al., "A model of Task Migration in Partitionable Parallel Processing Systems, " IEEE Second Symposium on the Frontiers of Massively Parallel Computations 211-14 (1988).*

UnKnown Authors, "Processor Array", May 9, 2007, en.wikipedia.org/wiki/Processor_array.*

International Search Report issued Aug. 3, 2010 in International (PCT) Application No. PCT/JP2010/003388.

Extended European Search Report mailed Feb. 13, 2013 in corresponding European Application No. 10780223.3.

* cited by examiner

FIG. 7

| OS identifier | Number of tasks | Task ID |
|---|---|---|
| 1st OS | 70 | 1st task, 2nd task, , , Hth task |
| 2nd OS | 50 | (H+1)th task, (H+2)th task, , , Ith task |
| 3rd OS | 30 | (I+1)th task, (I+2)th task, , , Jth task |
| 4th OS | 20 | (J+1)th task, (J+2)th task, , , Kth task |
| 5th OS | 15 | (K+1)th task, (K+2)th task, , , Lth task |
| 6th OS | 9 | (L+1)th task, (L+2)th task, , , Mth task |
| 7th OS | 8 | (M+1)th task, (M+2)th task, , , Nth task |
| 8th OS | 0 | - |
| 9th OS | 0 | - |
| 10th OS | 0 | - |
| 11th OS | 0 | - |
| 12th OS | 0 | - |
| 13th OS | 0 | - |
| 14th OS | 0 | - |
| 15th OS | 0 | - |
| 16th OS | 0 | - |
| 17th OS | 0 | - |
| 18th OS | 0 | - |
| 19th OS | 0 | - |
| 20th OS | 0 | - |
| 21st OS | 0 | - |
| 22nd OS | 0 | - |
| 23rd OS | 0 | - |
| 24th OS | 0 | - |
| 25th OS | 0 | - |

When one OS is assigned

When two OSs are assigned

When three OSs are assigned

When four OSs are assigned

When five OSs are assigned

When 25 OSs are assigned

FIG. 15

| Number of tasks | Task assignment flag | Power voltage | Operating frequency |
|---|---|---|---|
| 0 | 0 | 0V | 0Hz |
| | 1 | 0.7V | |
| 1~10 | 0 or 1 | 0.8V | 100MHz |
| 11~30 | 0 or 1 | 1.0V | 300MHz |
| 31~60 | 0 or 1 | 1.1V | 600MHz |
| 61 or more | 0 or 1 | 1.2V | 800MHz |

FIG. 23
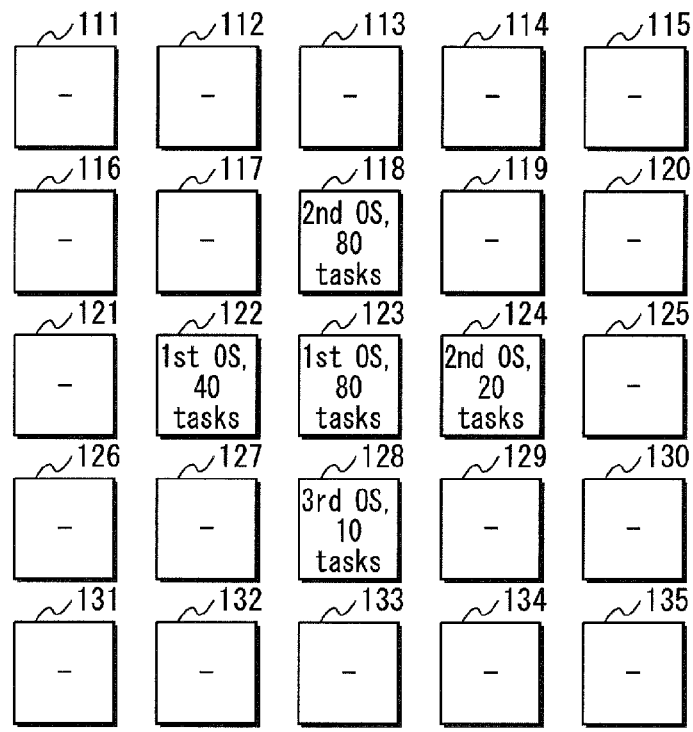
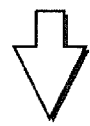
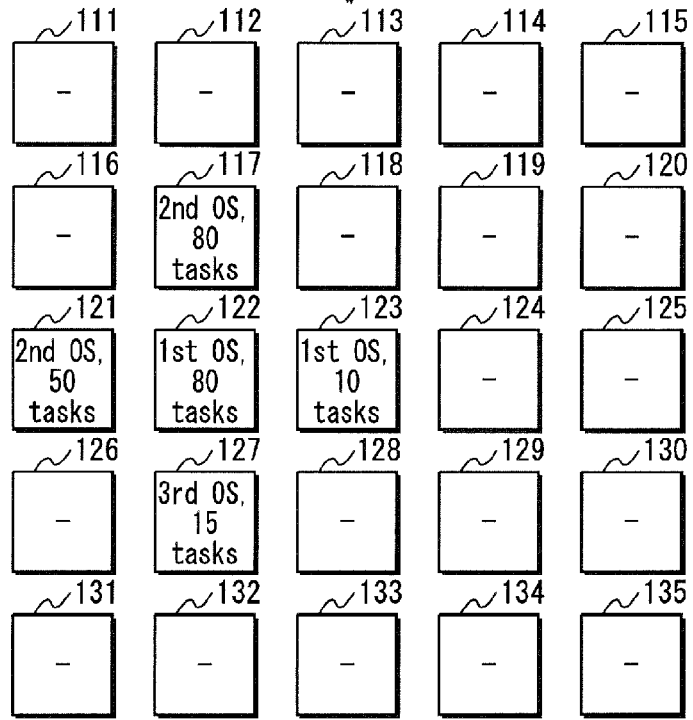

MULTIPROCESSOR SYSTEM, MULTIPROCESSOR CONTROL METHOD, AND MULTIPROCESSOR INTEGRATED CIRCUIT

TECHNICAL FIELD

The present invention relates to a multiprocessor system composed of a plurality of processors.

BACKGROUND ART

The multiprocessor system is a system in which a plurality of processors are arranged in a matrix and adjacent processors are connected with each other.

The multiprocessor system is characterized in that a plurality of processors can process tasks in parallel and thus can process a larger amount of tasks per unit time than a processor system composed of a single processor.

On the other hand, home electric appliances such as digital TVs and mobile phones are required to have low electric consumption as well as high functionality.

A technology for performing the power control in units of power islands (Patent Literature 1) is known, for example, as a technology for realizing low power consumption of LSI (Large Scale Integration) installed in home electric appliances.

CITATION LIST

Patent Literature

Patent Literature 1: Tokuhyo (published Japanese translation of PCT international publication for patent application) No. 2007-501478

SUMMARY OF INVENTION

Technical Problem

In the above multiprocessor system, each processor needs to communicate with other processors. For example, when a processor is to process a task assigned to the processor itself by using a task processing result of another task, the processor needs to communicate with the other processor.

When processors that are to communicate with each other are not directly connected with each other, the communication is performed via one or more processors that are present on a path connecting the processors.

The processor, which is present on the path connecting the processors that are to communicate with each other, needs to perform a routing process pertaining to the communication between the other processors to realize the communication, as well as processing of a task assigned to the processor itself.

Accordingly, in the above multiprocessor system, some processors need to perform the routing process pertaining to the communication between other processors, as well as processing of the task originally assigned to the processors themselves.

To realize the low power consumption in the above multiprocessor system, it is required to reduce the power consumption in the above routing process by performing the routing process efficiently, as well as realizing the low power consumption in each processor.

It is therefore an object of the present invention to provide a multiprocessor system in which tasks are assigned to each processor so that the routing process can be performed efficiently.

Solution to Problem

The above object is fulfilled by a multiprocessor system for, including therein three or more processors communicating with each other, processing a group of tasks, the multiprocessor system comprising: a storage unit storing connection information reflecting connection relationships between processors; and a task management unit operable to assign tasks, which are to be processed by one or more processors, to said one or more processors by referring to the connection information stored in the storage unit, wherein the task management unit assigns tasks to each processor so that, when there are a first processor and a second processor, the number of processors each assigned with one or more tasks and directly connected with the second processor being smaller than the number of processors each assigned with one or more tasks and directly connected with the first processor, the amount of tasks assigned to the first processor is equal to or larger than the amount of tasks assigned to the second processor.

Advantageous Effects of Invention

In a multiprocessor system, in general, a processor assigned with a larger amount of tasks is apt to perform a larger amount of communication with other processors assigned with tasks, than a processor assigned with a smaller amount of tasks.

With the above structure, tasks are assigned so that, when there are a first processor and a second processor, the number of processors each assigned with one or more tasks and directly connected with the second processor being smaller than the number of processors each assigned with one or more tasks and directly connected with the first processor, the amount of tasks assigned to the first processor is equal to or larger than the amount of tasks assigned to the second processor. Thus the multiprocessor system with the above structure of the present invention produces an advantageous effect that the tasks are assigned to each processor so that the routing process can be performed efficiently.

The above-described multiprocessor system may further comprise: an operating frequency determining unit operable to determine an operating frequency of each processor in accordance with the amount of tasks assigned to each processor by the task management unit; and an operation control unit operable to cause each processor to operate at the operating frequency determined by the operating frequency determining unit, wherein the operating frequency determining unit determines operating frequencies so that an operating frequency of the first processor is equal to or higher than an operating frequency of the second processor.

With the above structure, the second processor, which is assigned with an amount of tasks equal to or smaller than the amount of tasks assigned to the first processor, is equal to or lower than the first processor in operating frequency. In this way, the operating frequency of each processor is determined efficiently, thereby improving the power consumption for the performance of the multiprocessor system.

The above-described multiprocessor system may further comprise: an operating voltage determining unit operable to, when it is found, based on the operating frequencies determined by the operating frequency determining unit, that there are a processor operating at the first operating frequency and a processor operating at the second operating frequency which is lower than the first operating frequency, determine operating voltages of each processor so that an operating voltage of the processor operating at the first operating frequency is equal to or higher than an operating voltage of the processor operating at the second operating frequency; and a voltage supply unit operable to supply the operating voltages determined by the operating voltage determining unit to each processor.

With the above structure, the operating voltage of a processor operating at the second operating frequency, which is lower than the first operating frequency, is set to be equal to or lower than that of a processor operating at the first operating frequency. Thus the multiprocessor system with the above structure of the present invention produces an advantageous effect that the operating voltage of each processor is determined efficiently, thereby improving the power consumption for the performance of the multiprocessor system.

In the above-described multiprocessor system, the task management unit may assign the tasks so that one or more tasks are assigned to at least one of processors that are connected with each of said one or more processors to which the tasks are assigned.

The above structure produces an advantageous effect that a communication between processors assigned with tasks is realized without causing a processor assigned with no task to perform the routing process.

In the above-described multiprocessor system, the operating frequency determining unit may determine the operating frequencies so that, when there is a processor to which no task is assigned, an operating frequency of the processor to which no task is assigned is 0 hertz.

The above structure makes it possible to stop the operation of processors which have not been assigned with tasks, and thus produces an advantageous effect that the operating power of processors which have not been assigned with tasks can be zeroed.

In the above-described multiprocessor system, the amount of tasks may be the number of tasks.

In a multiprocessor system, in general, a processor assigned with a higher number of tasks is apt to perform a larger amount of communication with other processors assigned with tasks, than a processor assigned with a lower number of tasks.

Also, in general, a small amount of calculation is required for a processor to count the number of tasks.

Thus the above structure of the multiprocessor system produces an advantageous effect that a small amount of power is consumed to calculate the amount of tasks.

In the above-described multiprocessor system, the task management unit may include a timer operable to measure time elapses of a predetermined time period, and assign the tasks at every interval of the predetermined time period so that a processor having the largest amount of tasks among processors currently assigned is not a processor having the largest amount of tasks among processors to be assigned next.

In a multiprocessor system, in general, a processor to which the largest amount of tasks have been assigned among processors assigned with tasks is apt to have the largest amount of heat generation per unit time among all processors.

Furthermore, processors, when heated to more than a predetermined temperature, may enter a state (runaway state) where they do not operate properly. It is known that a larger amount of power is consumed when a processor at a high temperature executes a process than when a processor at a low temperature executes the process.

It is also known that when a processor at a high temperature is continuously used to execute a process, the defect occurrence rate in the processor increases due to deterioration caused by the heat.

Thus, with the above structure, the processor having been assigned with the largest amount of tasks is changed at every interval of the predetermined time period. This reduces the possibility that a processor in the runaway state occurs, compared to the case where the processor having been assigned with the largest amount of tasks is not changed intentionally. This accordingly produces an advantageous effect that the increase in the amount of power consumption is restricted, and the increase in the defect occurrence rate is restricted.

In the above-described multiprocessor system, all processors included in the multiprocessor system may be arranged in a matrix in a single semiconductor integrated circuit, and each processor may be in a same rectangular shape and be directly connected with adjacent processors.

The above structure produces an advantageous effect that it is possible to reduce the amount of power consumption when a communication between processors is performed, compared to a case where all processors are not integrated in a single semiconductor integrated circuit.

BRIEF DESCRIPTION OF DRAWINGS

FIG. 7 shows the data structure of the OS task correspondence information.

FIG. 15 shows the modified voltage frequency information.

FIG. 23 shows one example of OSs having been assigned to each processor and the number of tasks having been assigned thereto.

DESCRIPTION OF EMBODIMENTS

Embodiment 1

The following describes, as an embodiment of the multiprocessor system of the present invention, a multiprocessor system realized by a multiprocessor LSI in which 25 processors are arranged in a 5×5 matrix.

Each of the processors constituting the multiprocessor LSI can operate at independent operating frequency and operating voltage.

On the multiprocessor LSI, a hypervisor, a plurality of OSs operating on the hypervisor, and tasks assigned to the OSs operate.

The hypervisor assigns each OS to one processor, and causes each OS to operate on the assigned processor.

The following describes the structure of the multiprocessor system in Embodiment 1 with reference to the drawings.
<Structure>

Figure 1:
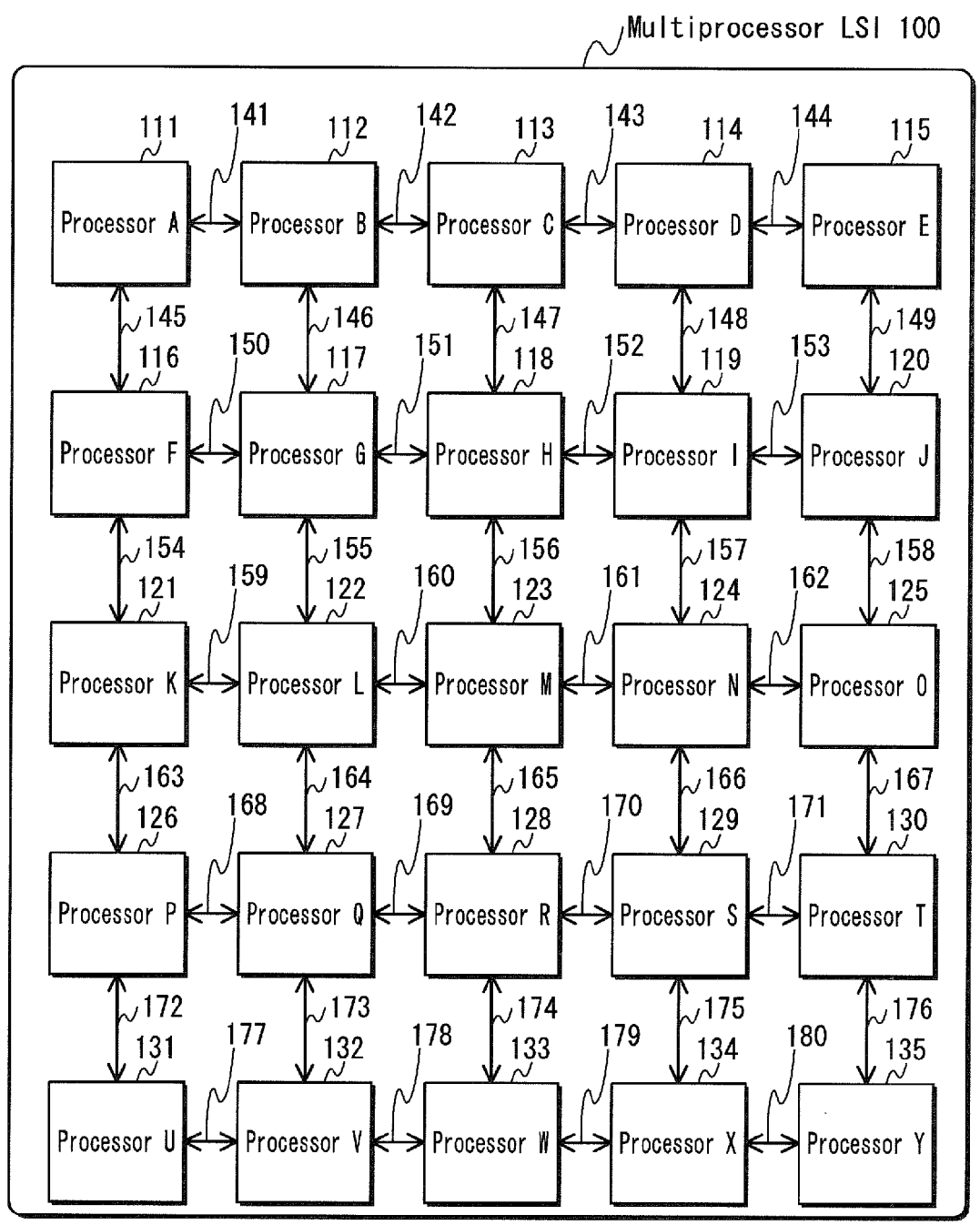
FIG. 1 shows the connection relationship between the processors arranged in a multiprocessor LSI 100.

FIG. 1 shows the connection relationship between the 25 processors (processor A 111 through processor Y 135) which are arranged in a multiprocessor LSI 100.

As shown in FIG. 1, the processor A 111 through processor Y 135 are arranged in a 5×5 matrix. The 25 processors have the same functions and same shape and operate in parallel with each other by communicating with other processors.

Each of dedicated communication line groups 141 through 180 connects adjacent processors.

Each processor is connected with an adjacent processor via a dedicated communication line group.

The communication between adjacent processors is performed directly by using the dedicated communication line group; and the communication between not-adjacent processors is performed via one or more processors that are present on a path connecting the processors.

The processor, which is present on the path connecting the processors that are to communicate with each other, needs to perform the routing process pertaining to the communication between the other processors to realize the communication, as well as processing of a task assigned to the processor itself.

For example, the processor A 111 and the processor D 114 perform a communication via the processors B 112 and C 113.

Figure 2:
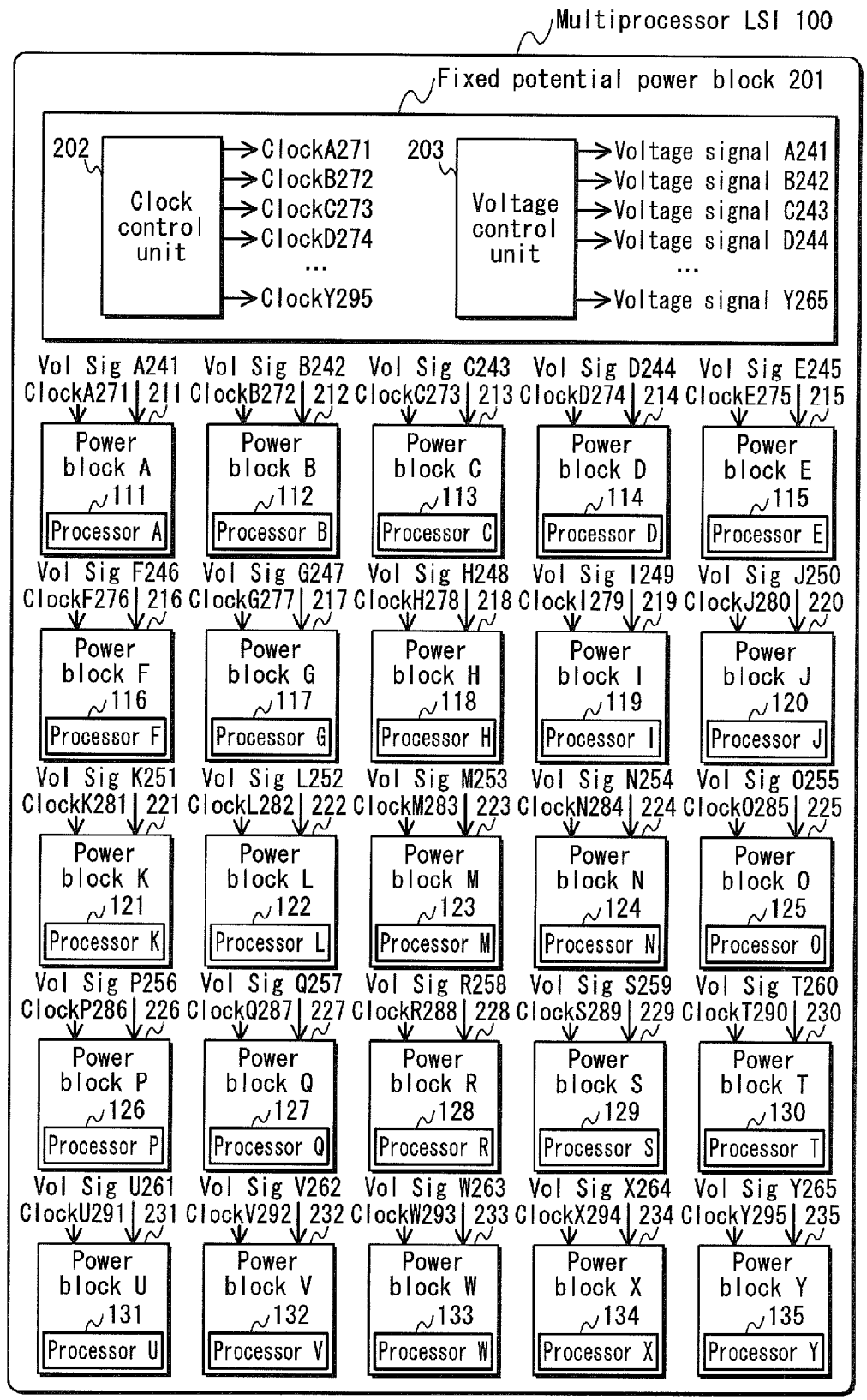
FIG. 2 is a block diagram showing the structure of the power block in the multiprocessor LSI 100.

FIG. 2 is a block diagram showing the structure of the power block in the multiprocessor LSI 100. It should be noted here that the power block is a block composed of a plurality of circuits having the same power voltage in common, and each power block operates with an independent power voltage.

As shown in FIG. 2, the multiprocessor LSI 100 includes 26 power blocks, a fixed potential power block 201 and power blocks A 211 through Y 235.

The fixed potential power block 201 is a power block whose power voltage is fixed to 1.2 V, and includes a clock control unit 202 and a voltage control unit 203.

The clock control unit 202 is controlled by the hypervisor operating on the multiprocessor LSI 100, and has a function to supply clock signals Clock A 271 through Clock Y 295 to each of the power blocks A 211 through Y 235.

Here, each of the Clock A 271 through Clock Y 295 is independently set to one frequency among 800 MHz, 600 MHz, 300 MHz, 100 MHz, and 0 Hz.

Figure 3:
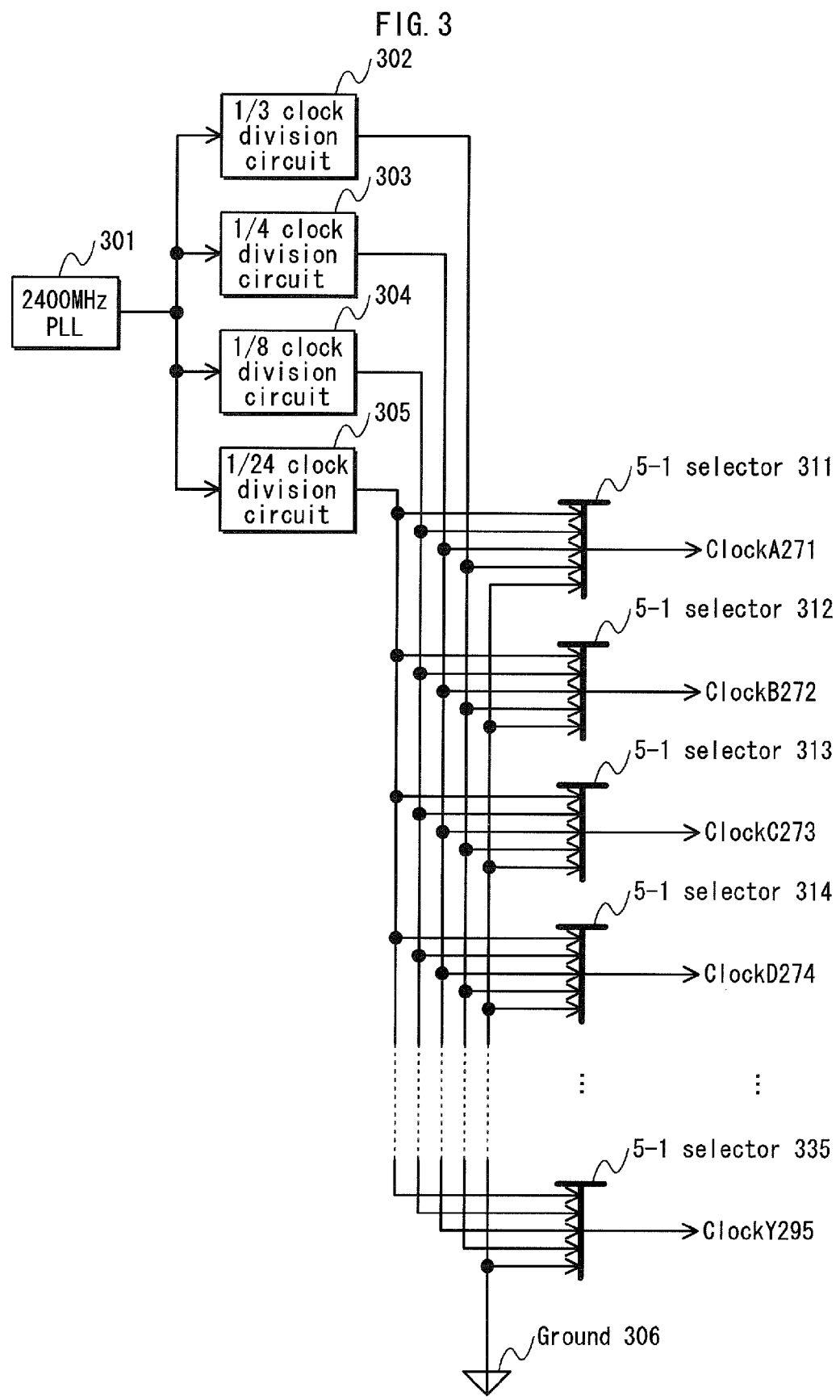
FIG. 3 is a block diagram of the clock control unit 202.

FIG. 3 is a block diagram of the clock control unit 202.

The clock control unit 202 includes a 2400 MHz PLL (Phase Locked Loop) 301, a ⅓ clock division circuit 302, a ¼ clock division circuit 303, a ⅛ clock division circuit 304, a 1/24 clock division circuit 305, and 5-1 selectors 311 through 335, and outputs 25 clock signals Clock A 271 through Clock Y 295.

Here, each of the Clock A 271 through Clock Y 295 is independently set to one frequency among 800 MHz, 600 MHz, 300 MHz, 100 MHz, and 0 Hz.

The 2400 MHz PLL 301 is a PLL which outputs a clock signal with frequency of 2.4 GHz.

The ⅓ clock division circuit 302 divides the frequency 2.4 GHz of the signal output from the 2400 MHz PLL 301 by three, and outputs signals of 800 MHz. The ¼ clock division circuit 303 divides the frequency 2.4 GHz of the signal output from the 2400 MHz PLL 301 by four, and outputs signals of 600 MHz. The ⅛ clock division circuit 304 divides the frequency 2.4 GHz of the signal output from the 2400 MHz PLL 301 by eight, and outputs signals of 300 MHz. The 1/24 clock division circuit 305 divides the frequency 2.4 GHz of the signal output from the 2400 MHz PLL 301 by 24, and outputs signals of 100 MHz.

The 5-1 selectors 311 through 335 is a 5-input selector which selects one among an output signal of 800 MHz from the ⅓ clock division circuit 302, an output signal of 600 MHz from the ¼ clock division circuit 303, an output signal of 300 MHz from the ⅛ clock division circuit 304, an output signal of 100 MHz from the 1/24 clock division circuit 305, and a ground 306 at the potential VSS, and outputs the selected one as a clock signal.

Each of the 5-1 selectors 311 through 335 is independently controlled by the hypervisor operating on the multiprocessor LSI 100.

With the above-described structure, the clock control unit 202 outputs clock signals Clock A 271 through Clock Y 295 each of which has one frequency among 800 MHz, 600 MHz, 300 MHz, 100 MHz, and 0 Hz.

Also, the clock control unit 202 is set to output a clock signal of 800 MHz to a clock signal Clock M 283 for the processor M 123, a processor at the center, when the multiprocessor LSI 100 is activated.

Back to FIG. 2, description of the structure of the power block in the multiprocessor LSI 100 is continued.

The voltage control unit 203 is controlled by the hypervisor operating on the multiprocessor LSI 100, and has a function to output voltage signals A 241 through Y 265 to each of the power blocks A 211 through Y 235, wherein each voltage signal is a signal indicating a power voltage of a power block.

Each of the voltage signals A 241 through Y 265 is a signal indicating one voltage among 1.2 V, 1.1 V, 1.0 V, 0.8 V, and 0 V.

The voltage control unit 203 is set to output a signal indicating 1.2 V of voltage as a voltage signal M 253 when the multiprocessor LSI 100 is activated. The setting is made for the processor M 123 to be operated with 1.2 V of power voltage in the activation.

The power of the multiprocessor LSI 100 is provided with, over the whole chip, a 1.2 V power wire which is a mesh wire with 1.2 V of voltage, a 1.1 V power wire which is a mesh wire with 1.1 V of voltage, a 1.0 V power wire which is a mesh wire with 1.0 V of voltage, a 0.8 V power wire which is a mesh wire with 0.8 V of voltage, and a ground wire which is a mesh wire with 0 V of voltage.

The power blocks A 211 through Y 235, including the processors A 111 through Y 135 respectively, each operate based on Clock A 271 through Clock Y 295 input therein as clock signals, and with power voltages indicated by the voltage signals A 241 through Y 265, respectively.

Figure 4:
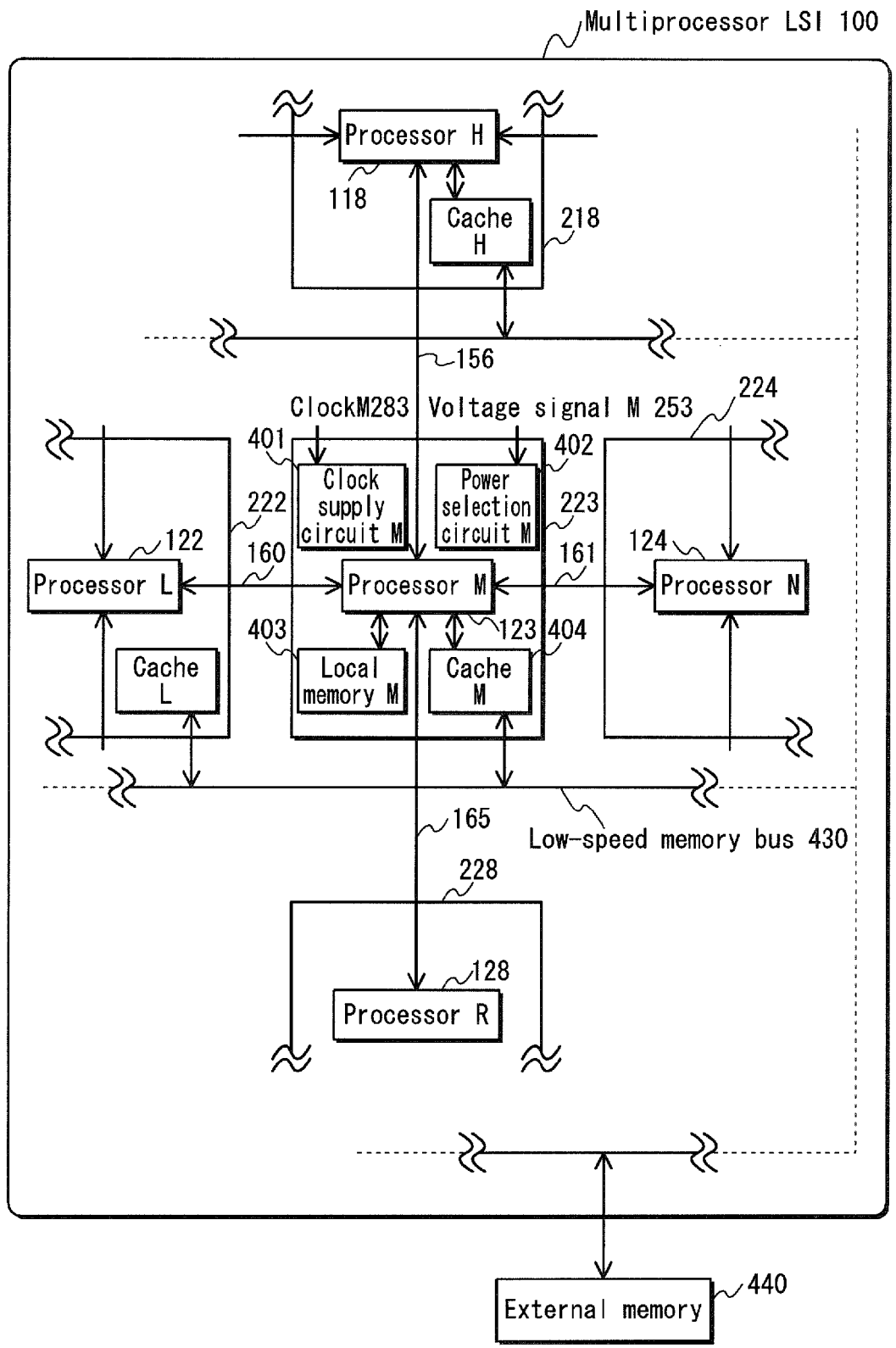
FIG. 4 is a block diagram showing the structure of the power block M 223.

FIG. 4 is a block diagram showing the structure of the power block M 223.

Here the structure of the power block is described by using the power block M 223 as an example, but the other power blocks have the same structure as the power block M 223.

The power block M 223 includes a processor M 123, a clock supply circuit M 401, a power selection circuit M 402, a local memory M 403, and a cache M 404.

The clock supply circuit M 401 has a function to receive a clock signal Clock M 283 from the clock control unit 202 and supply the received clock signal to the processor M 123, the power selection circuit M 402, the local memory M 403, and the cache M 404.

The power selection circuit M 402 has a function to receive a voltage signal M 253 from the voltage control unit 203 and supply a power voltage of the voltage indicated by the received voltage signal M 253 to the processor M 123, the clock supply circuit M 401, the local memory M 403, and the cache M 404.

The power selection circuit M 402 supplies power to the clock supply circuit M 401, the local memory M 403, and the cache M 404 by selecting, in accordance with the received voltage signal M 253, one power from among the powers supplied to the 1.2 V, 1.1 V, 1.0 V, and 0.8 V power wires, which are mesh wires, and the ground wire, and supplying the voltage of the selected power to the power wire in the power block.

Figure 5:
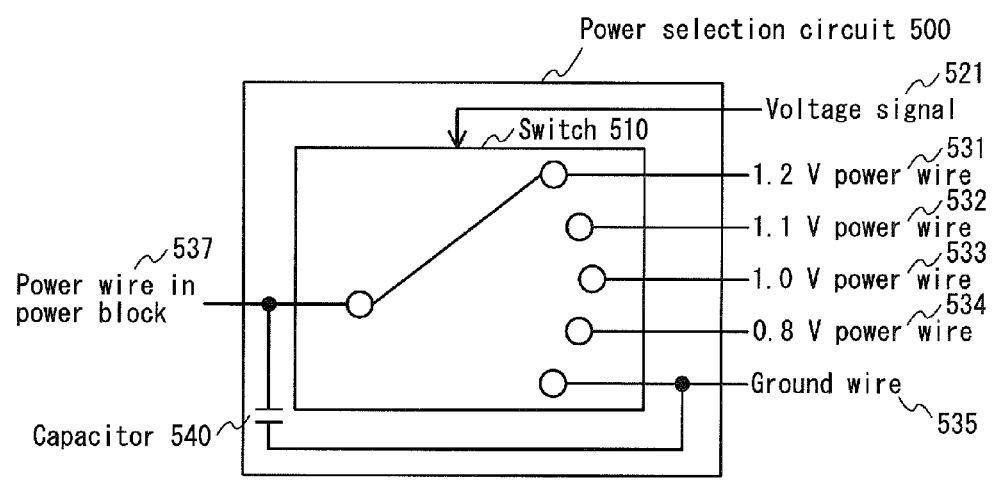
FIG. 5 is a block diagram showing the structure of the power selection circuit.

FIG. 5 is a block diagram showing the structure of the power selection circuit.

As shown in FIG. 5, a power selection circuit 500 is provided with a switch 510.

The switch 510 selects, in accordance with the voltage signal 521, one power wire from among a 1.2 V power wire 531, a 1.1 V power wire 532, a 1.0 V power wire 533, a 0.8 V power wire 534, and a ground wire 535, and electrically connects the selected power wire with a power wire 537 in the power block.

A capacitor 540 is provided in the power selection circuit 500 to remove the voltage noise that occurs when the switch changes the connection.

With the above-described structure, the power selection circuit 500 supplies one power voltage among 1.2 V, 1.1 V, 1.0 V, 0.8 V, and 0 V to the clock supply circuit M 401, the local memory M 403, and the cache M 404.

Back to FIG. 4 again, description of the structure of the power block M 223 is continued.

The local memory M 403 is a memory that is connected with the processor M 123 and is used by the processor M 123 as a memory area, and temporarily stores programs or data used by the processor M 123.

The cache M 404 is a cache memory connected with the processor M 123 and the memory bus 430, and is used as a cache memory when the processor M 123 accesses an external memory 440 which is connected therewith via the memory bus 430.

The processor M123 is connected with a processor H 118 of a power block H 218, a processor L 122 of a power block L 222, a processor N 124 of a power block N224, a processor R 128 of a power block R 228, a local memory M 403 within the same power block, a cache M 404 within the same power block, and executes a program stored in the external memory 440 which is connected with the cache M 404 via the memory bus 430. In this way, the processor M123 operates cooperatively with other processors by using the local memory M 403, the cache M 404 and others to realize various functions.

Also, the processor M 123 has a function to perform the above-described routing process.

Figure 6:
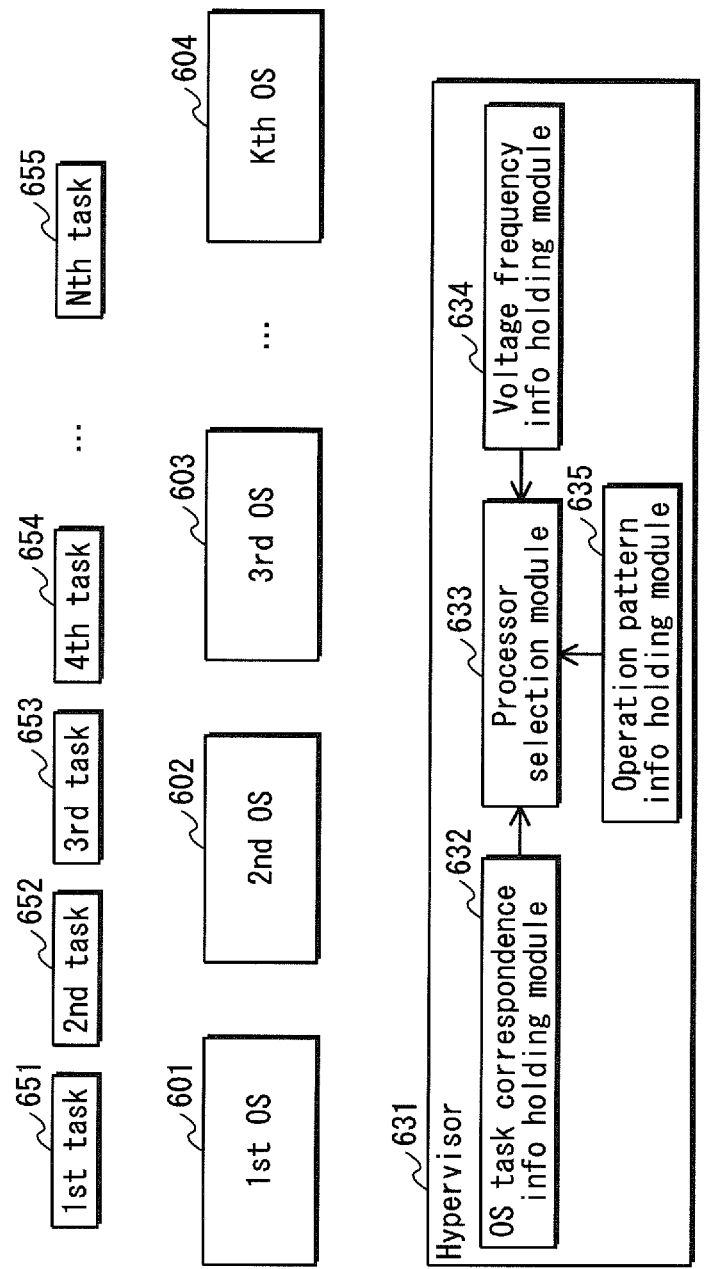
FIG. 6 is a block diagram showing modules which operate on the multiprocessor LSI 100.

FIG. 6 is a block diagram showing program modules (hereinafter merely referred to as "modules") which operate on the multiprocessor LSI 100.

The modules operating on the multiprocessor LSI 100 include a hypervisor 631, OSs (the $1^{st}$ OS 601 through $K^{th}$ OS 604) operating on the hypervisor 631, and tasks (the $1^{st}$ task 651 through $N^{th}$ task 655) operating on each OS.

These modules operate when the program stored in the external memory 440 is executed by one or more processors among the processors A 111 through Y 135.

Each of the $1^{st}$ task 651 through $N^{th}$ task 655 is assigned to one OS among the $1^{st}$ OS 601 through $K^{th}$ OS 604.

The $1^{st}$ OS 601 through $K^{th}$ OS 604 are different from each other in type. Each of the $1^{st}$ OS 601 through $K^{th}$ OS 604 is assigned to one of the processors A 111 through Y 135 by the hypervisor 631 and operates on the assigned processor.

Since there are 25 processors in the multiprocessor LSI 100, 25 OSs at maximum can operate on the multiprocessor LSI 100.

The hypervisor 631 includes an OS task correspondence information holding module 632, a processor selection module 633, a voltage frequency information holding module 634, and an operation pattern information holding module 635. The hypervisor 631 has a function to assign each of the $1^{st}$ OS 601 through $K^{th}$ OS 604 to one of the processors A 111 through Y 135, determine the power voltage and operating frequency of each of the assigned processors, and cause each processor to operate at the determined power voltage and operating frequency.

The OS task correspondence information holding module 632 has a function to communicate with the processor selection module 633, read the OS task correspondence information from a predetermined storage area of the external memory 440, and hold the read information.

The OS task correspondence information is information indicating the number of tasks assigned to each OS and task IDs of the assigned tasks.

FIG. 7 shows the data structure of the OS task correspondence information held by the OS task correspondence information holding module 632.

As shown in FIG. 7, the OS task correspondence information includes, in correspondence with each other, an OS identifier 701 identifying OSs, a number of tasks 702 indicating the number of tasks assigned to each OS identified in the OS identifier 701, and a task ID 703 identifying the tasks assigned to each OS identified in the OS identifier 701.

The OS task correspondence information shown in FIG. 7 indicates that seven OSs in total, the $1^{st}$ OS through the $7^{th}$ OS, are executed by the multiprocessor LSI 100, 70 tasks are assigned to the $1^{st}$ OS, 50 tasks are assigned to the $2^{nd}$ OS, 30 tasks are assigned to the $3^{rd}$ OS, 20 tasks are assigned to the $4^{th}$ OS, 15 tasks are assigned to the $5^{th}$ OS, nine tasks are assigned to the $6^{th}$ OS, and eight tasks are assigned to the $7^{th}$ OS.

Back to FIG. 6, the description of the structure of the hypervisor 631 is continued.

The voltage frequency information holding module 634 has a function to communicate with the processor selection module 633, read the voltage frequency information from a predetermined storage area of the external memory 440, and hold the read information.

The voltage frequency information is information for setting the power voltage and operating frequency of each processor in accordance with the number of tasks assigned to the processor.

Figure 8:
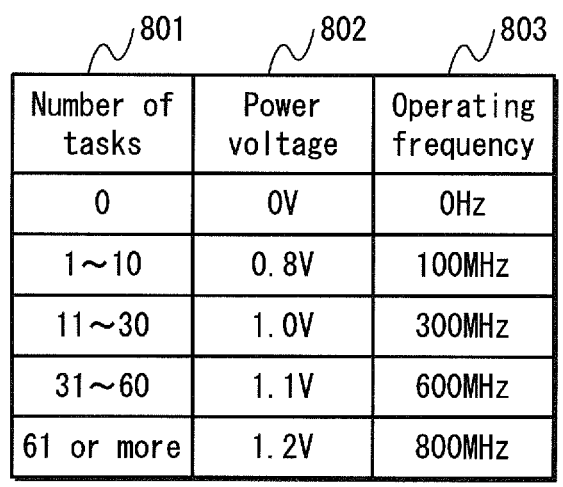
FIG. 8 shows the data structure of the voltage frequency information.

FIG. 8 shows the data structure of the voltage frequency information held by the voltage frequency information holding module 634.

As shown in FIG. 8, the voltage frequency information includes, in correspondence with each other, a number of tasks 801 indicating value ranges of the number of tasks assigned to each OS, a power voltage 802 indicating power voltages of power blocks, and an operating frequency 803 indicating the operating frequencies of the processors.

The voltage frequency information shown in FIG. 8 indicates that, for example, a power block, to which processors assigned with 61 or more tasks belong, is supplied with 1.2 V of power voltage, and the processors of the power block operate at 800 MHz of operating frequency.

Back to FIG. 6 again, the description of the structure of the hypervisor 631 is continued.

The operation pattern information holding module 635 has a function to communicate with the processor selection module 633, read the operation pattern information from a predetermined storage area of the external memory 440, and hold the read information.

The operation pattern information is information indicating locations of processors to which OSs are assigned, for each of the case where one OS is assigned through the case where 25 OSs are assigned, wherein OSs assigned with tasks are assigned to the processors and the OSs are assigned in descending order of the number of tasks assigned thereto.

Here the operation pattern information associates the OSs with the processors so that, when two processors among processors to which tasks are assigned are referred to as "$1^{st}$ processor" and "$2^{nd}$ processor" and the number of processors each assigned with one or more tasks and directly connected with the $2^{nd}$ processor is smaller than the number of processors each assigned with one or more tasks and directly connected with the $1^{st}$ processor, the amount of tasks assigned to the $1^{st}$ processor is equal to or larger than the amount of tasks assigned to the $2^{nd}$ processor.

FIGS. 9A through 9F illustrate the operation pattern information held by the operation pattern information holding module 635.

Figure 9A:
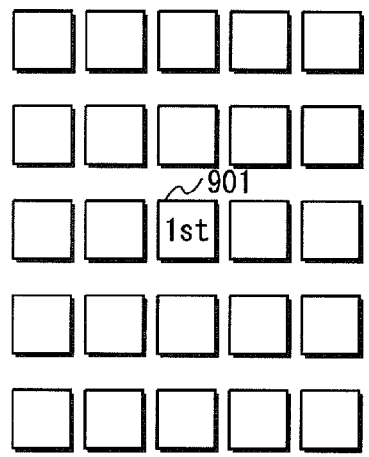
FIGS. 9A through 9F illustrate the operation pattern information.
Figure 9B:
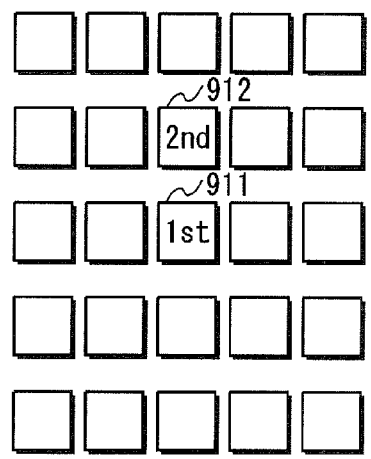
Figure 9C:
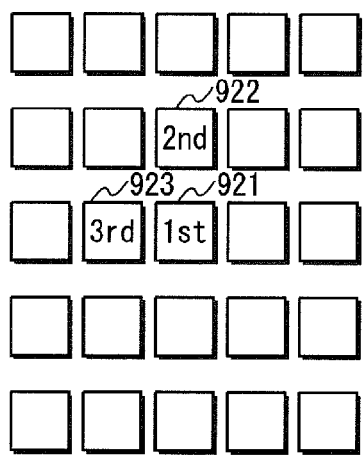
Figure 9D:
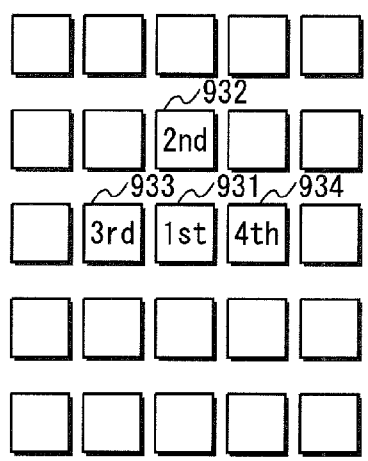
Figure 9E:
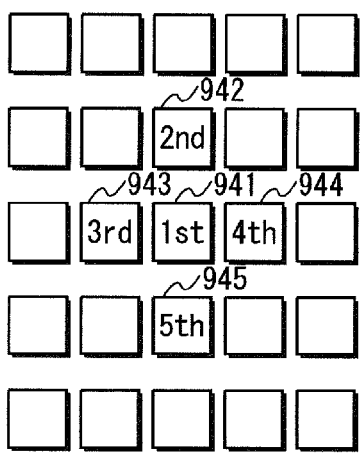
Figure 9F:
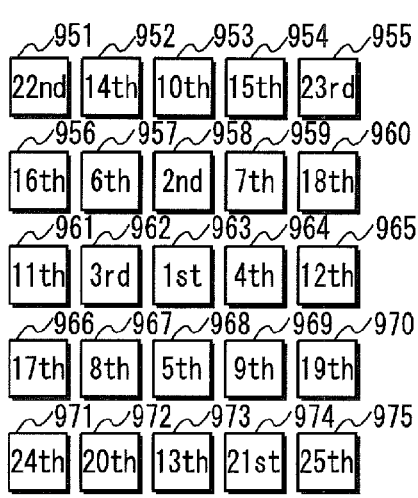

FIGS. 9A through 9F indicate processors, in terms of position, to which OSs are assigned, the OSs being assigned to the processors in the descending order of the number of tasks assigned to the OSs. FIG. 9A shows the processor to which an OS assigned with tasks is assigned. FIG. 9B shows two processors to which respective two OSs assigned with tasks are assigned. FIG. 9C shows three processors to which respective three OSs assigned with tasks are assigned. FIG. 9D shows four processors to which respective four OSs assigned with tasks are assigned. FIG. 9E shows five processors to which respective five OSs assigned with tasks are assigned. FIG. 9F shows 25 processors to which respective 25 OSs assigned with tasks are assigned.

Back to FIG. 6 again, the description of the structure of the hypervisor 631 is continued.

The processor selection module 633 communicates with the OS task correspondence information holding module 632, the voltage frequency information holding module 634, and the operation pattern information holding module 635 and has the following four functions.

Function 1: to determine the processors to which the OSs are to be assigned, based on the OS task correspondence information held by the OS task correspondence information holding module 632 and the operation pattern information held by the operation pattern information holding module 635.

Function 2: to refer to the voltage frequency information held by the voltage frequency information holding module 634, and determine, for each of the processors to which OSs are to be assigned, the operating frequency and the power voltage based on the number of tasks assigned to the OSs that have been assigned to the processor in concern.

Function 3: to store a set of a processor, an OS assigned thereto, an operating frequency, and a power voltage, control the clock control unit 202 to realize the determined operating frequency, and control the voltage control unit 203 to realize the determined power voltage.

Function 4: to transmit an activation signal to the processor to activate the processor. It should be noted here that the activation signal is a reset release signal, and each processor is activated when the reset is released in the state where the power is supplied.

The following describes the operation of the multiprocessor system having the above structure with reference to the attached drawings.

<Operation>

The multiprocessor LSI 100 realizes various functions depending on the software that is executed thereon. For example, the multiprocessor LSI 100 realizes functions such as the MPEG (Moving Picture Experts Group) encoding and image processing.

In Embodiment 1, the multiprocessor LSI 100 is configured to be activated by an external controller, and when activated, read out a program from a predetermined memory area in the external memory 440, and execute the program. The controller is configured to, before activating the multiprocessor LSI 100, upload the program, which is to be executed by the multiprocessor LSI 100, to the predetermined memory area.

Here, an explanation is given of the activation process which is performed after the multiprocessor LSI 100 is activated until the processors constituting the multiprocessor LSI 100 start to execute the tasks.

Figure 10:
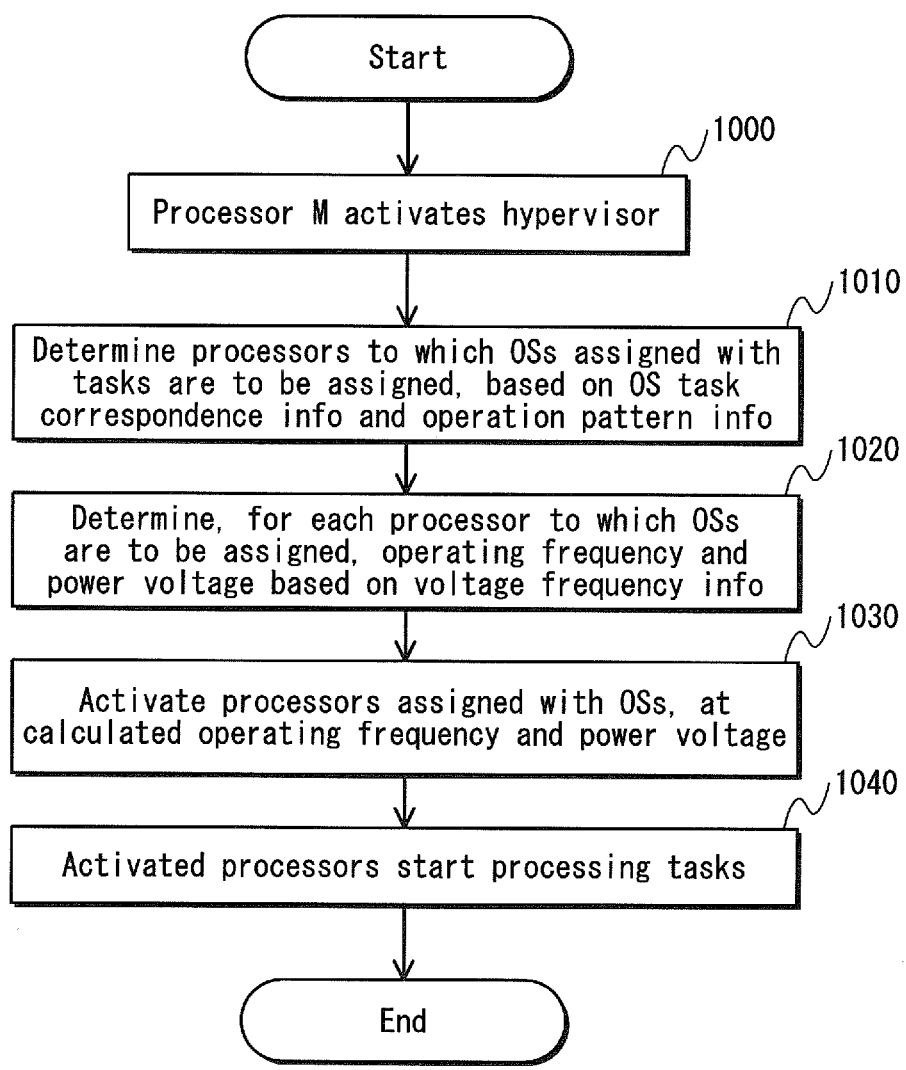
FIG. 10 is a flowchart of the activation process.

FIG. 10 is a flowchart of the activation process performed by the multiprocessor system in the present embodiment.

When the multiprocessor LSI 100 is activated, 1.2V of power voltage and 800 MHz of clock signal are supplied to the processor M 123, and the processor M 123 is activated.

When activated, the processor M 123 activates the hypervisor 631 on the processor itself (step S1000).

When the hypervisor 631 is activated, the OS task correspondence information holding module 632 reads the OS task correspondence information from a predetermined storage area of the external memory 440, and holds the read information, and the operation pattern information holding module 635 reads the operation pattern information from a predetermined storage area of the external memory 440, and holds the read information.

Next, the processor selection module 633 determines the processors to which the OSs are to be assigned, based on the OS task correspondence information held by the OS task correspondence information holding module 632 and the operation pattern information held by the operation pattern information holding module 635, the OSs being assigned in the descending order of the number of tasks assigned thereto (step S1010).

After determining the processors to which the OSs are to be determined, the processor selection module 633 refers to the voltage frequency information held by the voltage frequency information holding module 634, and determines, for each of the processors to which OSs are to be assigned, the operating frequency and the power voltage based on the number of tasks assigned to the OSs that have been assigned to the processor in concern (step S1020).

After determining the operating frequency and the power voltage, the processor selection module 633 controls the clock control unit 202 to realize the determined operating frequency, and controls the voltage control unit 203 to realize the determined power voltage (step S1030).

When activated, each processor having received the activation signal activates the hypervisor on the processor itself, and activates the assigned OS on the hypervisor.

Each of the activated processors starts processing the tasks assigned to the OS which was assigned to the processor (step S1040).

<Specific Example>

In the following, a supplementary explanation will be given of the steps S1010 and S1020 among the steps of the above activation process, by taking a specific example.

In this specific example, the OS task correspondence information held by the OS task correspondence information holding module 632 is the one shown in FIG. 7.

In step S1010, the processor selection module 633 detects, from the OS task correspondence information held by the OS task correspondence information holding module 632, that the number of OSs to which tasks have been assigned is seven, and accordingly reads a piece of operation pattern information for the case where there are seven OSs to which tasks have been assigned, among a plurality of pieces of operation pattern information held by the operation pattern information holding module 635.

Figure 11:
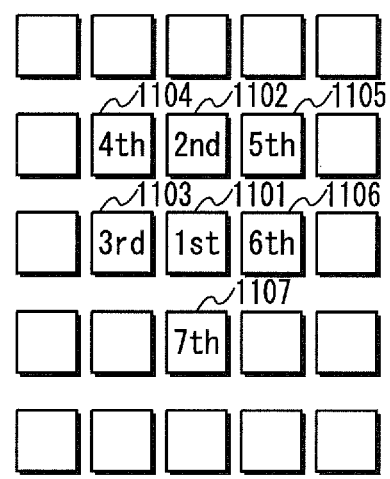
FIG. 11 illustrates the operation pattern information for the case where there are seven OSs to which tasks have been assigned.

FIG. 11 illustrates the piece of operation pattern information for the case where there are seven OSs to which tasks have been assigned, among a plurality of pieces of operation pattern information held by the operation pattern information holding module 635.

As shown in FIG. 11, the operation pattern information, in the case where there are seven OSs assigned with tasks, indicates that the OSs are assigned one-to-one to the processors in the order of processor 1101, processor 1102, processor 1103, processor 1104, processor 1105, processor 1106, and processor 1107, wherein the OSs are assigned to the processors in descending order of the number of tasks assigned to the OSs.

Thus the processor selection module 633 determines that the $1^{st}$ OS is assigned to the processor M 123, the $2^{nd}$ OS to the processor H 118, the $3^{rd}$ OS to the processor L 122, the $4^{th}$ OS to the processor G 117, the $5^{th}$ OS to the processor I 119, the $6^{th}$ OS to the processor N 124, and the $7^{th}$ OS to the processor R 128.

Next, the processor selection module 633 refers to the voltage frequency information held by the voltage frequency information holding module 634, and determines for the processor M 123 to which the $1^{st}$ OS assigned with 70 tasks is assigned, that the operating frequency is 800 MHz and the power voltage is 1.2 V, determines for the processor H 118 to which the $2^{nd}$ OS assigned with 50 tasks is assigned, that the operating frequency is 600 MHz and the power voltage is 1.1 V, determines for the processor L 122 to which the $3^{rd}$ OS assigned with 30 tasks is assigned, that the operating frequency is 300 MHz and the power voltage is 1.0 V, determines for the processor G 117 to which the $4^{th}$ OS assigned with 20 tasks is assigned, that the operating frequency is 300 MHz and the power voltage is 1.0 V, determines for the processor I 119 to which the $5^{th}$ OS assigned with 15 tasks is assigned, that the operating frequency is 300 MHz and the power voltage is 1.0 V, determines for the processor N 124 to which the $6^{th}$ OS assigned with 9 tasks is assigned, that the operating frequency is 100 MHz and the power voltage is 0.8 V, and determines for the processor R 128 to which the $7^{th}$ OS assigned with 8 tasks is assigned, that the operating frequency is 100 MHz and the power voltage is 0.8 V (step S1020).

It also determines for the processors to which no OS (assigned with tasks) is assigned, that the operating frequency is 0 MHz and the power voltage is 0 V.

Figure 12:
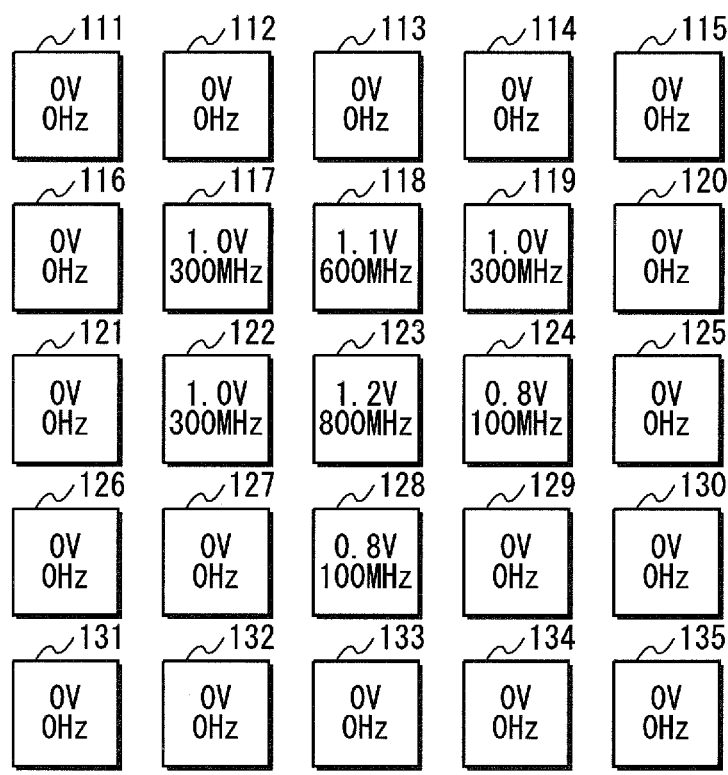
FIG. 12 shows the operating frequency and the power voltage determined for each processor in an example.

FIG. 12 shows the operating frequency and the power voltage having been determined for each processor in the above example.

As shown in FIG. 12, 0 Hz of operating frequency and 0 V of power voltage are determined for the processors A 111 through F 116, J 120, K121, O 125 through Q 127, and S 129 through Y 135; 800 MHz of operating frequency and 1.2 V of power voltage are determined for the processor M 123; 600 MHz of operating frequency and 1.1 V of power voltage are determined for the processor H 118; 300 MHz of operating frequency and 1.0 V of power voltage are determined for the processors L 122, G 117, and I 119; and 100 MHz of operating frequency and 0.8 V of power voltage are determined for the processors N 124 and R 128.

According to the above multiprocessor system, when tasks of a task group targeted to be processed by the multiprocessor system are assigned to a plurality of processors to be executed by them, the tasks are assigned to the processors so that, when two processors among processors to which tasks are assigned are referred to as "$1^{st}$ processor" and "$2^{nd}$ processor" and the number of processors each assigned with one or more tasks and directly connected with the $2^{nd}$ processor is smaller than the number of processors each assigned with one or more tasks and directly connected with the $1^{st}$ processor, the amount of tasks assigned to the $1^{st}$ processor is equal to or larger than the amount of tasks assigned to the $2^{nd}$ processor.

A processor assigned with a higher number of tasks is apt to perform a larger amount of communication with other processors assigned with tasks, than a processor assigned with a lower number of tasks. Also, a communication between directly connected processors does not require passing through other processors.

Therefore the present multiprocessor system assigns tasks to each processor so that the routing process can be performed efficiently.

Also, according to the above multiprocessor system, the $2^{nd}$ processor, which is assigned with an amount of tasks equal to or smaller than the amount of tasks assigned to the $1^{st}$ processor, is equal to or lower than the $1^{st}$ processor in operating frequency. In this way, the operating frequency of each processor is determined efficiently, thereby improving the power consumption for the performance of the multiprocessor system.

Also, the above multiprocessor system can stop the operation of processors which have not been assigned with tasks. This makes it possible to zero the operating power of processors which have not been assigned with tasks.

Furthermore, according to the above multiprocessor system, the operating voltage of a processor operating at the second operating frequency, which is lower than the first operating frequency, is set to be equal to or lower than that of a processor operating at the first operating frequency. In this way, the operating voltage of each processor is determined efficiently, thereby improving the power consumption for the performance of the multiprocessor system.

Embodiment 2

The following describes, as an embodiment of the multiprocessor system of the present invention, a modified multiprocessor system in Embodiment 2 for which the multiprocessor system in Embodiment 1 is partly modified.

The modified multiprocessor system monitors the number of processing-target tasks at regular intervals (for example, every five minutes), and if it detects a change in the number of the processing-target tasks, it re-assigns the tasks to the processors.

The modified multiprocessor system, similar to the above multiprocessor system, is realized by a multiprocessor LSI in which 25 processors are arranged in a 5×5 matrix.

In the multiprocessor system in Embodiment 1, each of "k" pieces of OSs which have been assigned with tasks is assigned to a processor. On the other hand, in the modified multiprocessor system in Embodiment 2, three OSs operate on a processor and each OS is assigned to one or more processors.

Also, when it is supplied with 0.7 V of power voltage and 0 Hz of clock signal, each processor enters a state where it does not operate as a processor, but keeps the data stored in the registers or the like as they are.

The following describes the structure of the modified multiprocessor system in Embodiment 2, centering on the differences from the multiprocessor system in Embodiment 1 with reference to the drawings.

<Structure>

The differences in hardware between the modified multiprocessor LSI in Embodiment 2 and the multiprocessor LSI 100 in Embodiment 1 are as follows: (1) a 0.7 V power wire which is a mesh wire with 0.7 V of voltage has been added as a mesh power wire; (2) the voltage control unit 203 has been modified to a modified voltage control unit; (3) the power selection circuit 500 of each power block has been modified to a power selection circuit 1300; and (4) the clock control unit 202 has been modified to a modified clock control unit.

Also, the differences between the modules operating on the modified multiprocessor LSI and the modules operating on the multiprocessor LSI 100 are as follows: (1) the hypervisor 631 has been modified to a hypervisor 1431; and (2) the $1^{st}$ OS 601 through $K^{th}$ OS 604, as the OSs operating on the multiprocessor LSI 100, have been modified to the $1^{st}$ OS 1401 through the $3^{rd}$ OS 1403 as the OSs operating on the modified multiprocessor LSI.

The modified voltage control unit is controlled by the hypervisor 1431 operating on the modified multiprocessor LSI, and has a function to output voltage signals "a" through "y" to each of the power blocks A 211 through Y 235, wherein each voltage signal is a signal indicating a power voltage of a power block.

Each of the voltage signals A 241 through Y 265 output from the voltage control unit 203 is a signal that indicates one voltage among five voltages: 1.2 V, 1.1 V, 1.0 V, 0.8 V, and 0 V. On the other hand, each of the voltage signals "a" through "y" output from the modified voltage control unit is a signal that indicates one voltage among six voltages: 1.2 V, 1.1 V, 1.0 V, 0.8 V, 0.7 V, and 0 V.

Also, the modified voltage control unit set to output signals indicating 1.2 V of voltage as voltage signals "h", "l", and "m" when the modified multiprocessor LSI is activated. The setting is made for the processors H 118, L 122, and M 123 to be operated with 1.2 V of power voltage in the activation.

The power selection circuit 1300 has a function to receive voltage signals from the modified voltage control unit and supply power voltages of the voltages indicated by the received voltage signals to the processor, the clock supply circuit, the local memory, and the cache in the same power block.

The power selection circuit M 402 selects one power from among the five powers supplied to the 1.2 V, 1.1 V, 1.0 V, and 0.8 V power wires and the ground wire, and supplies the voltage of the selected power to the power wire in the block. On the other hand, the power selection circuit 1300 selects one power from among the six powers supplied to the 1.2 V, 1.1 V, 1.0 V, 0.8 V, and 0.7 V power wires and the ground wire, and supplies the voltage of the selected power to the power wire in the block.

Figure 13:
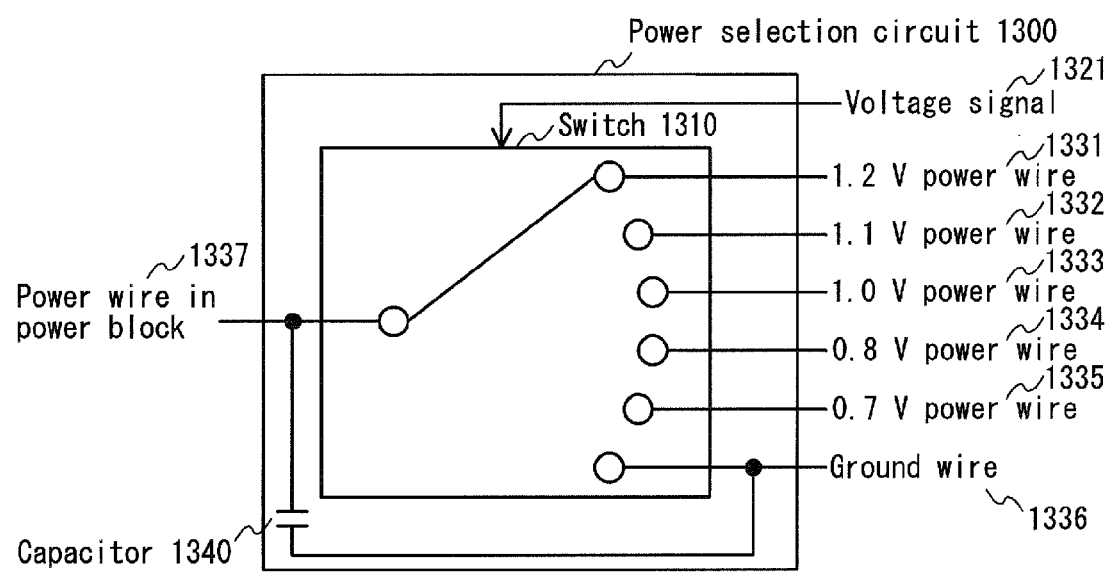
FIG. 13 is a block diagram showing the structure of the power selection circuit 1300.

FIG. 13 is a block diagram showing the structure of the power selection circuit 1300.

As shown in FIG. 13, the power selection circuit 1300 is provided with a switch 1310.

The switch 1310 selects, in accordance with the voltage signal 1321, one power wire from among a 1.2 V power wire 1331, a 1.1 V power wire 1332, a 1.0 V power wire 1333, a 0.8 V power wire 1334, a 0.7 V power wire 1335, and a ground wire 1336, and electrically connects the selected power wire with a power wire 1337 in the power block.

A capacitor 1340 is provided in the power selection circuit 1300 to remove the voltage noise that occurs when the switch changes the connection.

The clock control unit 202 is set to output a clock signal of 800 MHz to a clock signal Clock M 283 for the processor M 123 when the multiprocessor LSI 100 is activated. On the other hand, the modified clock control unit is set to output a clock signal of 800 MHz to Clock H 278, Clock L 282, and Clock M 283 when the modified multiprocessor LSI is activated. The setting is made for the processors H 118, L 122, and M 123 to be operated at 800 MHz of operating frequency in the activation.

Figure 14:
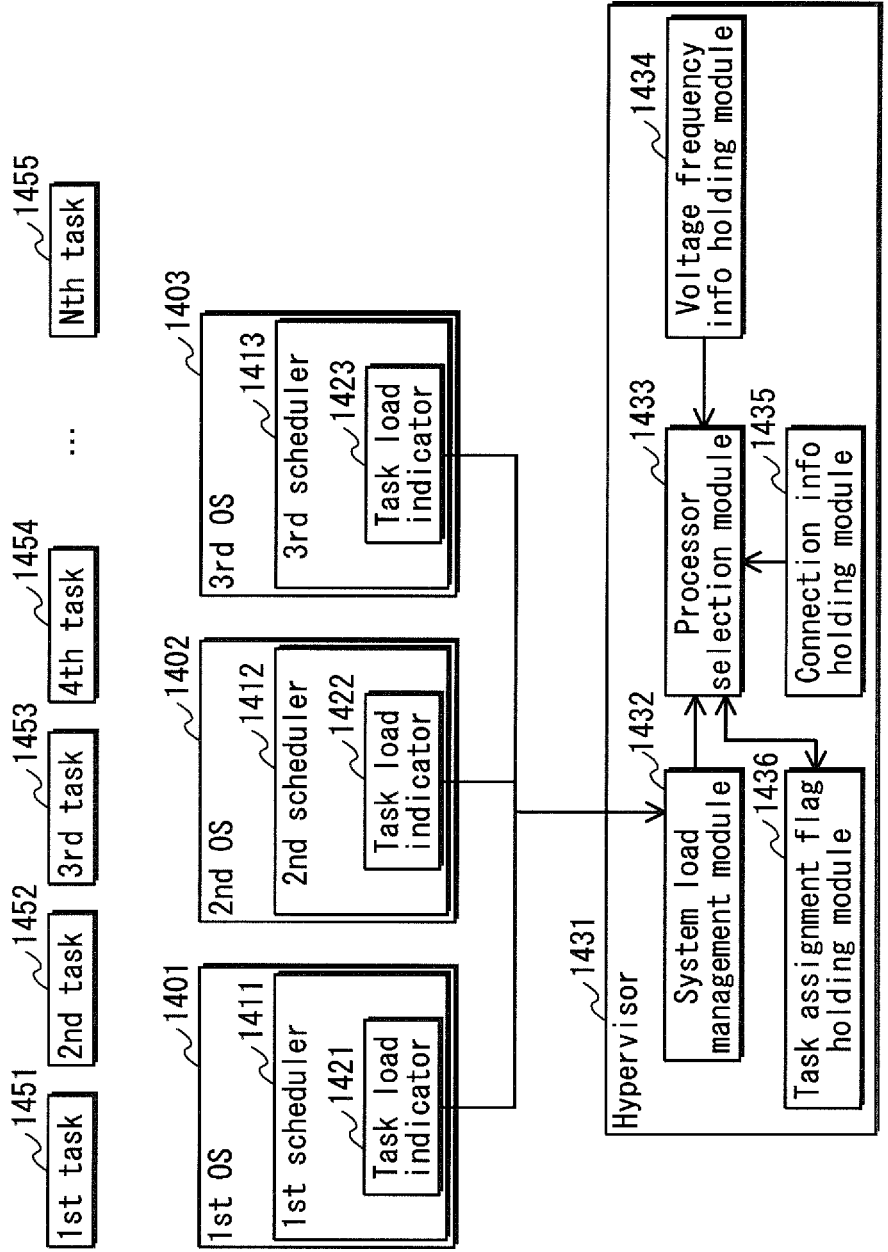
FIG. 14 is a block diagram indicating modules operating on the modified multiprocessor LSI.

FIG. 14 is a block diagram indicating modules operating on the modified multiprocessor LSI.

The modules operating on the modified multiprocessor LSI include a hypervisor 1431, OSs (the $1^{st}$ OS 1401 through the $3^{rd}$ OS 1403) operating on the hypervisor 1431, and tasks (the $1^{st}$ task 1451 through $N^{th}$ task 1455) operating on each OS.

These modules operate as the program stored in the external memory 440 is executed by one or more processors among the processors A 111 through Y 135.

Each of the $1^{st}$ task 1451 through $N^{th}$ task 1455 is assigned to one OS among the $1^{st}$ OS 1401 through $3^{rd}$ OS 1403.

The $1^{st}$ OS 1401 through the $3^{rd}$ OS 1403 are OSs of different types and are each provided with the $1^{st}$ scheduler 1411 through the $3^{rd}$ scheduler 1413 which have a function to schedule the tasks. Each OS is assigned by the hypervisor 1431 to one or more processors among the processors A 111 through Y 135, and operates on all processors to which it is assigned.

Each of the $1^{st}$ scheduler 1411 through the $3^{rd}$ scheduler 1413 has a function to schedule the tasks assigned to the processor on which the scheduler itself is activated, and a function to store a task load indicator that indicates the number of tasks that are the target of the scheduling performed by the scheduler itself.

When there is a change (increase or decrease) in the number of tasks assigned to the processor, the scheduler performs the scheduling again and updates the task load indicator to the number of tasks after the change in the number of tasks.

The number of tasks assigned to a processor may decrease when, for example, processing of an assigned task ends and it is excluded from the tasks targeted to be assigned. Also, the number of tasks assigned to a processor may increase when, for example, a task in the middle of processing causes a new task to occur.

The hypervisor 1431 is obtained by removing the OS task correspondence information holding module 632 and the operation pattern information holding module 635 from the hypervisor 631, modifying the processor selection module 633 to a processor selection module 1433, modifying the voltage frequency information holding module 634 to a voltage frequency information holding module 1434, and newly adding a system load management module 1432, a task assignment flag holding module 1436 and a connection information holding module 1435.

The task assignment flag holding module 1436 has a function to communicate with the processor selection module 1433 and hold respective task assignment flags of the processors A 111 through Y 135.

Here, the task assignment flag is a one-bit flag that indicates whether or not a task has ever been assigned to a corresponding processor during a period from the activation of the modified multiprocessor LSI up to now. The task assignment flag is set to "0" to indicate that no task has ever been assigned; and set to "1" to indicate that at least one task has ever been assigned.

The voltage frequency information holding module 1434 has a function to communicate with the processor selection module 1433, read the modified voltage frequency information from a predetermined storage area of the external memory 440, and hold the read information.

The modified voltage frequency information is information for setting the power voltage and operating frequency of each processor in accordance with the number of tasks assigned to the processor, and in accordance with the task assignment flag corresponding to the processor.

FIG. 15 shows the data structure of the modified voltage frequency information held by the voltage frequency information holding module 1434.

As shown in FIG. 15, the modified voltage frequency information includes, in correspondence with each other, a number of tasks 1501 indicating the number of tasks assigned to a processor, a task assignment flag 1502, a power voltage 1503 indicating the power voltage of the power block, and an operating frequency 1504 indicating the operating frequency of the processor.

According to the modified voltage frequency information in this example, for example, 0.7 V of power voltage is supplied to a power block having a processor to which "0" tasks are assigned and the corresponding task assignment flag is set to "1", and the processor operates with 0 Hz of operating frequency (that is to say, does not operate). Also, for example, 0.8 V of power voltage is supplied to a power block having a processor to which 1 to 10 tasks are assigned and the corresponding task assignment flag is set to "0" or "1", and the processor operates with 100 MHz.

It should be noted here that the state in which 0.7 V of power voltage is supplied to a power block but the processor belonging to the power block is not operating is the state in which data is kept stored in the storages belonging to the power block such as the local memory, cache memory, and registers in the processor because the power voltage is supplied thereto, but writing or reading of data is not performed because the processor is not operating.

Due to the state in which the data is kept stored even when the processor is not operating, when the processor operates next time, the processor can use the data without re-loading it.

A system load management module 1432 communicates with the 1$^{st}$ scheduler 1411 through the 3$^{rd}$ scheduler 1413 and the processor selection module 1433, and has the following four functions:

Function 1: a function as a timer for measuring the time elapses of a predetermined time period T1 (for example, one minute) and a predetermined time period T2 (for example, five minutes).

Function 2: a function to obtain, at every interval of a predetermined time period T2 (for example, five minutes), the task load indicators from schedulers that have been activated.

Function 3: a function to store the obtained task load indicators.

Function 4: a function to compare the stored task load indicators with newly obtained task load indicators, and when an amount of change between the total number of tasks indicated by the stored task load indicators and the total number of tasks indicated by the newly obtained task load indicators is equal to or greater than a predetermined amount (for example, 5%), overwrite the stored task load indicators with the newly obtained task load indicators, and transmit the newly obtained task load indicators to the processor selection module 1433.

The connection information holding module 1435 has a function to communicate with the processor selection module 1433, read the connection information from a predetermined storage area of the external memory 440, and hold the read information.

The connection information is information indicating the connection relationship between processors.

Figure 16:
FIG. 16 shows the data structure of the connection information.

FIG. 16 shows the data structure of the connection information held by the connection information holding module 1435.

As shown in FIG. 16, the connection information includes, in correspondence with each other, a processor ID 1601 identifying processors and a connected processor ID 1602 identifying processors that are directly connected with each processor identified by the processor ID 1601.

For example, the connection information indicates that the processor A is connected with the processor B and the processor F.

The processor selection module 1433 communicates with the system load management module 1432, the task assignment flag holding module 1436, the voltage frequency information holding module 1434, and the connection information holding module 1435, and has the following six functions:

Function 1: a function to, upon receiving the task load indicators from the system load management module, calculate, for each type of OS, the number of processors to which tasks are assigned, and calculate the number of tasks assigned to each of the calculated processors.

The processor selection module 1433, in execution of Function 1, calculates the number of processors to which tasks are assigned and the number of tasks assigned to the processors so that 80 tasks are assigned to each of the processors, the number of which equals the quotient of dividing, by 80, the total number of tasks indicated by the task load indicator for each type of OS, and so that as many tasks as the remainder of the division are assigned to one processor.

Function 2: a function to calculate candidates for processor groups to which tasks are to be assigned (hereinafter, the candidates are referred to as "task-assign processor group candidates"), based on the number of processors to which tasks are to be assigned, the number of tasks that are to be assigned to the processors, and the connection information held by the connection information holding module.

The processor selection module 1433, in execution of Function 2, calculates, based on the connection information, all combinations of processors to which tasks are to be assigned, selects, from all the calculated combinations, such combinations of processors that, when two processors among processors to which tasks are assigned are referred to as "1$^{st}$ processor" and "2$^{nd}$ processor" and the number of processors each assigned with one or more tasks and directly connected with the 2$^{nd}$ processor is smaller than the number of processors each assigned with one or more tasks and directly connected with the 1$^{st}$ processor, the amount of tasks assigned to the 1$^{st}$ processor is equal to or larger than the amount of tasks assigned to the 2$^{nd}$ processor, and calculates the processor groups matching the selected combinations as the task-assign processor group candidates.

Function 3: a function to select, from among the task-assign processor group candidates, a processor group that has the smallest difference in terms of a combination of processors belonging to a processor group and OSs assigned to the processors, from a processor group to which tasks are currently assigned, wherein it selects the processor group as a task-assign processor group to which tasks are assigned.

Function 4: a function to calculate, for each of the processors constituting the task-assign processor group, the operating frequency and the power voltage of the processor from the number of tasks assigned to the processor, based on the modified voltage frequency information held by the voltage frequency information holding module 1434 and the task assignment flag held by the task assignment flag holding module 1436.

Function 5: a function to control the modified clock control unit and the modified voltage control unit so that all the processors constituting the task-assign processor group operate at the calculated operating frequency and power voltage, and re-assign OSs and tasks to each of the processors constituting the task-assign processor group.

Function 6: a function to update the task assignment flags held by the task assignment flag holding module 1436.

The processor selection module 1433, in execution of Function 6, when the task-assign processor group includes a processor to which tasks are to be assigned newly, updates the task assignment flag for the processor in concern by changing the value thereof from "0" to "1", among the task assignment flags held by the task assignment flag holding module 1436.

The following describes the operation of the modified multiprocessor system having the above structure with reference to the attached drawings.

<Operation>

Here, an explanation is given of, among the processes performed by the modified multiprocessor system in Embodiment 2, the activation process which is performed after the modified multiprocessor LSI is activated until the schedulers of the OSs start scheduling the tasks, the system load management process in which the task load indicators are obtained from the schedulers of the OSs at regular intervals, and the processor selection process in which tasks are assigned to the processors.

<Activation Process>

Figure 17:
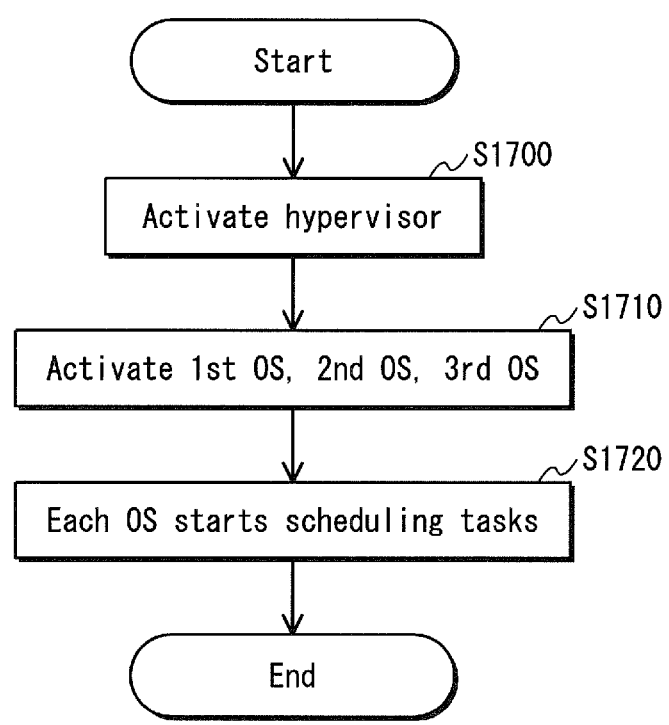
FIG. 17 is a flowchart of the activation process.

FIG. 17 is a flowchart of the activation process performed by the modified multiprocessor system in Embodiment 2.

Upon the activation of the modified multiprocessor LSI, 1.2 V of power voltage and 800 MHz of clock signal are supplied to the processors H 118, L 122, and M 123, and the processors H 118, L 122, and M 123 are activated.

When activated, the processors H 118, L 122, and M 123 activate the hypervisor 1431 on each of the processors themselves (step S1700).

Then the processor M 123 activates the 1$^{st}$ OS 1401 on the hypervisor 1431, the processor H 118 activates the 2$^{nd}$ OS 1402 on the hypervisor 1431, and the processor L 122 activates the 3$^{rd}$ OS 1403 on the hypervisor 1431 (step S1710).

After the 1$^{st}$ OS 1401, the 2$^{nd}$ OS 1402, and the 3$^{rd}$ OS 1403 are activated, the schedulers thereof start scheduling the tasks that are assigned to the processors on which the schedulers themselves are activated, and store the task assignment indicators indicating the numbers of tasks that are targeted to be scheduled by the schedulers themselves (step S1720).

The time taken from the activation of the hypervisor 1431 to the storage of the task assignment indicator by each scheduler is, for example, less than one minute.

<System Load Management Process>

Figure 18:
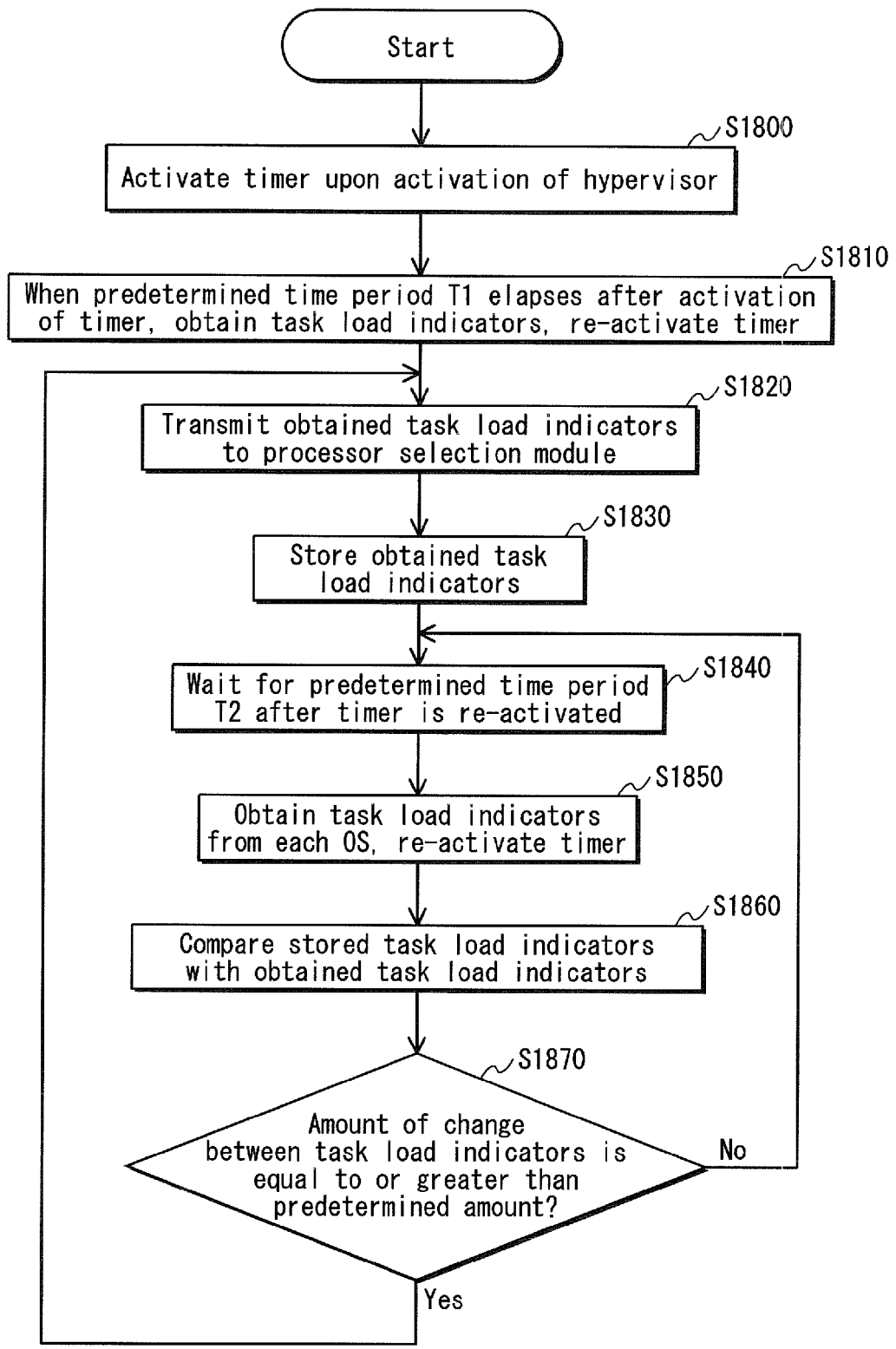
FIG. 18 is a flowchart of the system load management process.

FIG. 18 is a flowchart of the system load management process performed by the modified multiprocessor system in Embodiment 2.

Upon the activation of the hypervisor 1431, the system load management module 1432 activates the timer and starts measuring the time elapse of the predetermined time period T1 (for example, one minute) to wait for the schedulers to store the task load indicators in the activation process (step S1800).

When the predetermined time period T1 (for example, one minute) elapses after the activation of the timer, the system load management module 1432 obtains the task load indicators from the schedulers of the OSs, and re-activates the timer and starts measuring the time elapse of the predetermined time period T2 (for example, five minutes) (step S1810).

After obtaining the task load indicators, the system load management module 1432 transmits the obtained task load indicators of the OSs to the processor selection module 1433 (step S1820), and stores the obtained task load indicators of the OSs (step S1830).

After the process of step S1830 is completed, the system load management module 1432 waits for the predetermined time period T2 (for example, five minutes) to elapse (step S1840), and after the predetermined time period T2 elapses, obtains the task load indicators from the schedulers of the OSs, and re-activates the timer and starts measuring the time elapse of the predetermined time period T2 (for example, five minutes) again (step S1850).

After obtaining the task load indicators, the system load management module 1432 compares the stored task load indicators with the obtained task load indicators (step S1860).

When an amount of change between the total numbers of tasks indicated by the stored task load indicators and the obtained task load indicators is equal to or greater than a predetermined amount (for example, 5%) (step S1870: Yes), the modified multiprocessor system performs the process of step S1820 and subsequent steps again; and when the amount of change between the total numbers of tasks indicated by the stored task load indicators and the obtained task load indicators is smaller than the predetermined amount (for example, 5%) (step S1870: No), the modified multiprocessor system performs the process of step S1840 and subsequent steps again.

<Processor Selection Process>

Figure 19:
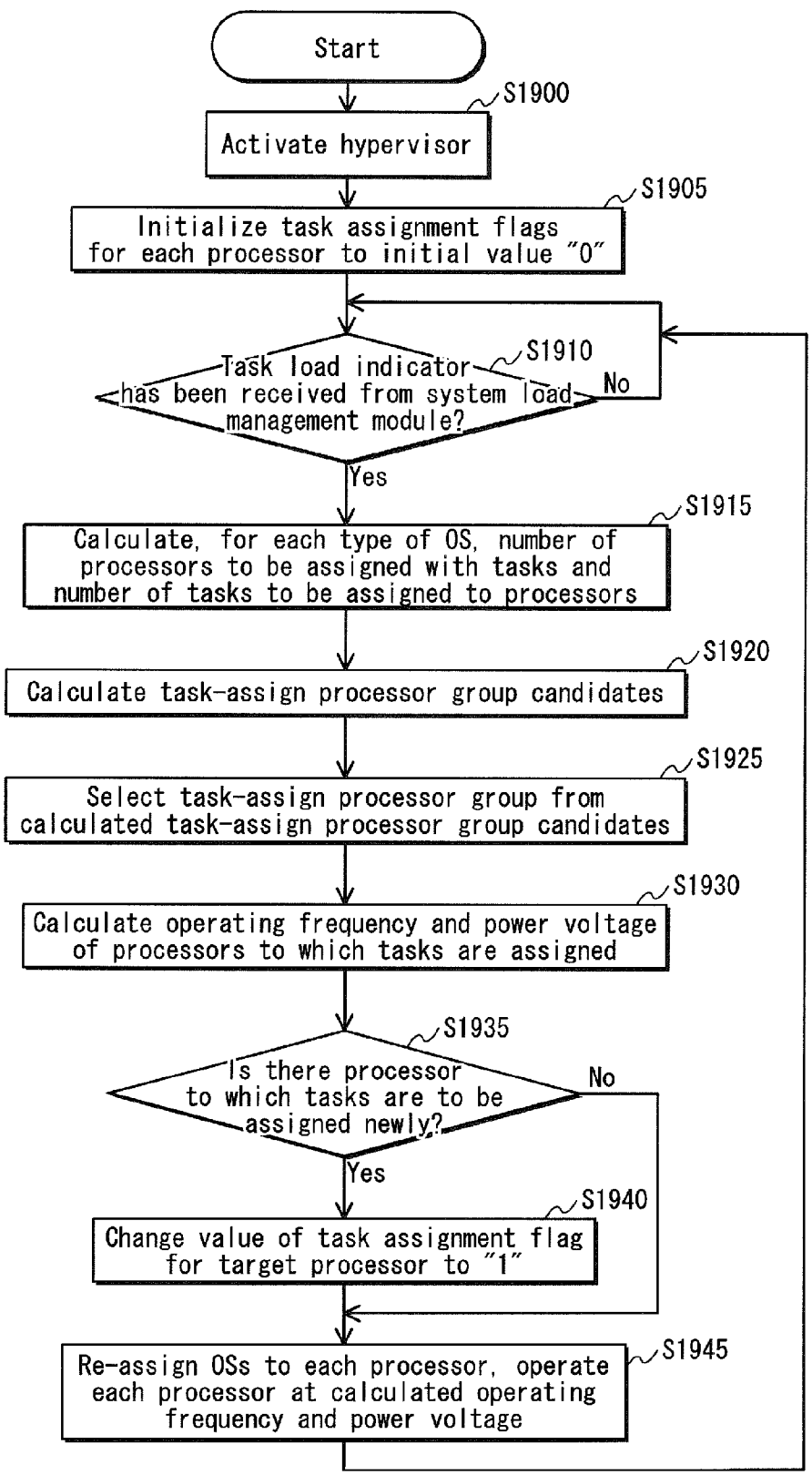
FIG. 19 is a flowchart of the processor selection process.

FIG. 19 is a flowchart of the processor selection process performed by the modified multiprocessor system in Embodiment 2.

After the hypervisor 1431 is activated (step S1900), the task assignment flag holding module 1436 initializes the task assignment flags for the processors held by the flag holding module itself to initial value "0" (step S1905).

After the process of step S1905 is completed, the processor selection module 1433 waits for the task load indicators to be transmitted from the system load management module 1432 (a loop from step S1910: No to step S1910).

In step S1910, upon receiving the task load indicators from the system load management module 1432 (step S1910: Yes), the processor selection module 1433 calculates the number of processors to which tasks are to be assigned, and calculates the number of tasks that are to be assigned to the processors (step S1915).

In step S1915, the processor selection module 1433 calculates the number of processors to which tasks are assigned and the number of tasks assigned to the processors so that 80 tasks are assigned to each of the processors, the number of which equals the quotient of dividing, by 80, the total number of tasks indicated by the task load indicator for each type of OS, and so that as many tasks as the remainder of the division are assigned to one processor.

After the process of step S1915 is completed, the processor selection module 1433 calculates the task-assign processor group candidates based on the number of processors to which tasks are to be assigned, the number of tasks that are to be assigned to the processors, and the connection information held by the connection information holding module 1435 (step S1920).

In step S1920, the processor selection module 1433 calculates, based on the connection information, all combinations of processors to which tasks are to be assigned, selects, from all the calculated combinations, such combinations of processors that, when two processors among processors to which tasks are assigned are referred to as "$1^{st}$ processor" and "$2^{nd}$ processor" and the number of processors each assigned with one or more tasks and directly connected with the $2^{nd}$ processor is smaller than the number of processors each assigned with one or more tasks and directly connected with the $1^{st}$ processor, the amount of tasks assigned to the $1^{st}$ processor is equal to or larger than the amount of tasks assigned to the $2^{nd}$ processor, and calculates the processor groups matching the selected combinations as the task-assign processor group candidates.

After the process of step S1920 is completed, the processor selection module 1433 selects, from among the calculated task-assign processor group candidates, a processor group that has the smallest difference in terms of a combination of processors belonging to a processor group and OSs assigned to the processors, from a processor group to which tasks are currently assigned, wherein it selects the processor group as a task-assign processor group to which tasks are assigned (step S1925).

After the process of step S1925 is completed, the processor selection module 1433 calculates, for each of the processors constituting the task-assign processor group, the operating frequency and the power voltage of the processor from the number of tasks assigned to the processor, based on the modified voltage frequency information held by the voltage frequency information holding module 1434 and the task assignment flag held by the task assignment flag holding module 1436 (step S1930).

After the process of step S1930 is completed, the processor selection module 1433 checks whether or not the task-assign processor group includes a processor to which tasks are to be assigned newly (step S1935).

It should be noted here that the processor to which tasks are to be assigned newly is a processor for which the task assignment flag held by the task assignment flag holding module 1436 is set to "0", among the processors to which tasks are assigned.

When it is judged in step S1935 that the task-assign processor group includes a processor to which tasks are to be assigned newly (step S1935: Yes), the processor selection module 1433 changes the value of the task assignment flag for the processor from "0" to "1" (step S1940).

When the process of step S1940 is completed, or when it is judged in step S1935 that the task-assign processor group does not include a processor to which tasks are to be assigned newly (step S1935: No), the processor selection module 1433 controls the modified clock control unit and the modified voltage control unit so that all the processors constituting the task-assign processor group operate at the calculated operating frequency and power voltage, and re-assign OSs and tasks to each of the processors constituting the task-assign processor group (step S1945).

After the process of step S1945 is completed, the modified multiprocessor system returns to the process in step S1910 and repeats the process of step S1910 and the subsequent steps.

According to the above modified multiprocessor system, when the number of tasks targeted to be processed by the modified multiprocessor system changes over time, it is possible to re-assign OSs and tasks to the processors.

It is thus possible to re-assign the tasks to the processors so that the routing process can be performed efficiently even if the amount of tasks targeted to be processed changes over time.

Embodiment 3

The following describes, as an embodiment of the multiprocessor system of the present invention, a further modified multiprocessor system in Embodiment 3 for which the modified multiprocessor system in Embodiment 2 is further modified partly.

The further modified multiprocessor system performs re-assignment of tasks to the processors at every interval of a predetermined time period (for example, five minutes) to prevent the processor to which the largest number of tasks are currently assigned from becoming a processor to which the largest number of tasks are to be assigned newly.

This is performed to prevent the thermal runaway which would occur when the large number of tasks are assigned to the same processor for a long time period.

The further modified multiprocessor system and the modified multiprocessor system have the same hardware structure, but are differ from each other in a part of the software structure.

The following describes the structure of the further modified multiprocessor system in Embodiment 3, centering on the differences from the modified multiprocessor system in Embodiment 2 with reference to the drawings.

Figure 20:
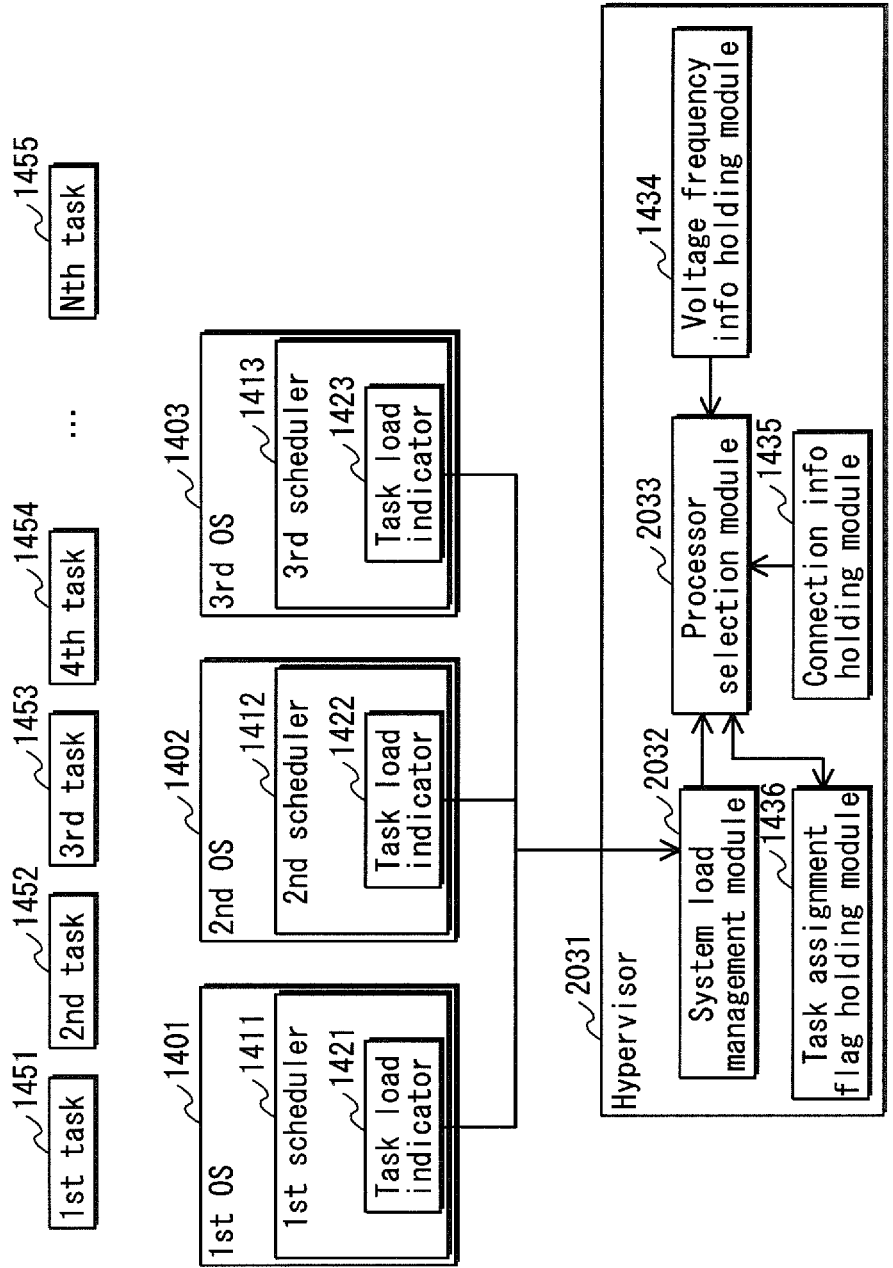
FIG. 20 is a block diagram indicating modules operating on the modified multiprocessor LSI.

FIG. 20 is a block diagram indicating modules operating on the modified multiprocessor LSI in the further modified multiprocessor system.

The modules operating in the further modified multiprocessor system are the same as those operating in the modified multiprocessor system, except that the hypervisor 1431 has been modified to a hypervisor 2031.

In the modification of the hypervisor 1431 to the hypervisor 2031, the system load management module 1432 is modified to a system load management module 2032, and the processor selection module 1433 is modified to a processor selection module 2033.

The system load management module 2032 communicates with the $1^{st}$ scheduler 1411 through the $3^{rd}$ scheduler 1413 and a processor selection module 2033, and has the following functions as well as Functions 1 and 2 of the system load management module 1432:

Function 3a: a function to transmit the obtained task load indicators to the processor selection module 2033.

The processor selection module 2033 communicates with the system load management module 2032, the task assignment flag holding module 1436, the voltage frequency information holding module 1434, and the connection information holding module 1435, and has the following functions as well as Functions 1, 2, 4, 5, and 6 of the processor selection module 1433:

Function 3b: a function to select a task-assign processor group that has the smallest difference in terms of a combination of processors belonging to a processor group and OSs assigned to the processors, from a processor group to which the tasks are currently assigned, so that in the selected task-assign processor group, a processor to which the largest number of tasks are assigned is different from the processor to which currently the largest number of tasks are assigned.

The following describes the operation of the further modified multiprocessor system having the above structure with reference to the attached drawings.

<Operation>

Here, an explanation is given of, among the processes performed by the further modified multiprocessor system in Embodiment 3, the modified system load management process in which the task load indicators are obtained from the schedulers of the OSs at regular intervals, and the modified processor selection process in which tasks are assigned to the processors.

<Modified System Load Management Process>

The modified system load management process is a modification of the system load management process in Embodiment 2, and is performed as follows: after the process of step S1820 in the system load management process in Embodiment 2 is completed, the process of step S1840 and the subsequent steps is executed without execution of step S1830, and after the process of step S1850 is completed, the process of step S1820 and the subsequent steps is executed again without execution of steps S1860 and S1870.

Figure 21:
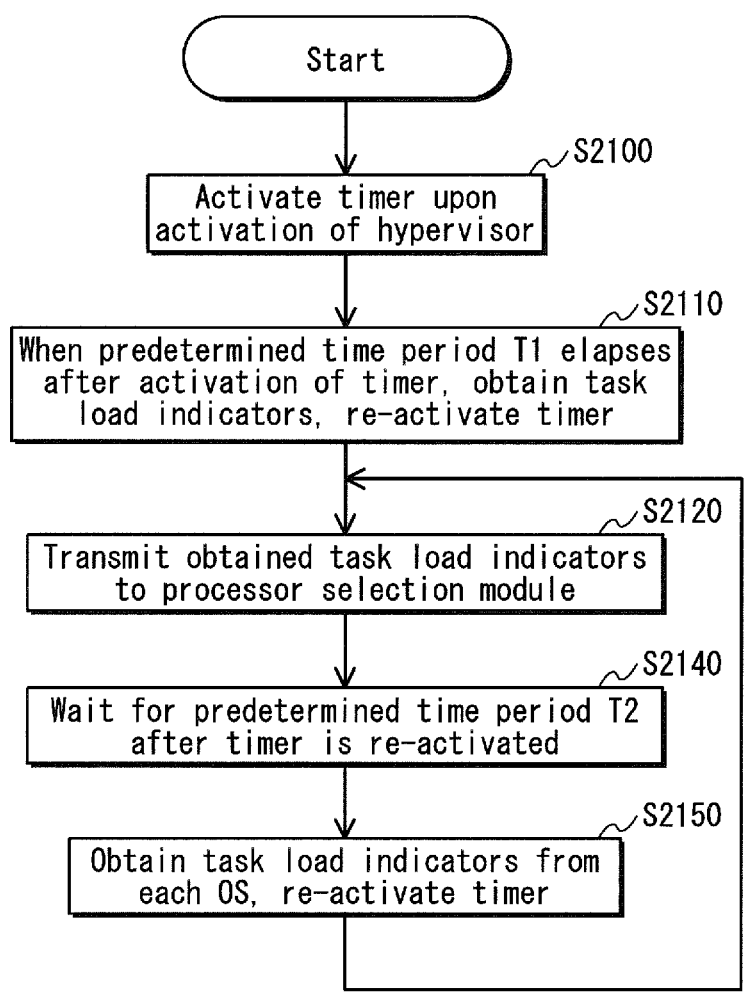
FIG. 21 is a flowchart of the modified system load management process.

FIG. 21 is a flowchart of the modified system load management process performed by the further modified multiprocessor system in Embodiment 3.

Steps S2100 through S2120 and steps S2140 through S2150 of this process correspond to steps S1800 through S1820 and steps S1840 through S1850 of the system load management process in Embodiment 2, respectively (see FIG. 18). Also, the hypervisor 1431 is replaced with the hypervisor 2031, the system load management module 1432 is replaced with the system load management module 2032, and the processor selection module 1433 is replaced with the processor selection module 2033.

Accordingly, the description thereof is omitted here.

After the process of step S2120 is completed, the further modified multiprocessor system performs the process of step S2140. After the process of step S2150 is completed, the further modified multiprocessor system performs the process of step S2120 and the subsequent steps again.

<Modified Processor Selection Process>

The modified system load management process is a modification of the system load management process in Embodiment 2, and in which the process of step S1925 of the processor selection process in Embodiment 2 has been replaced with the process of step S2225 which will be described later.

Figure 22:
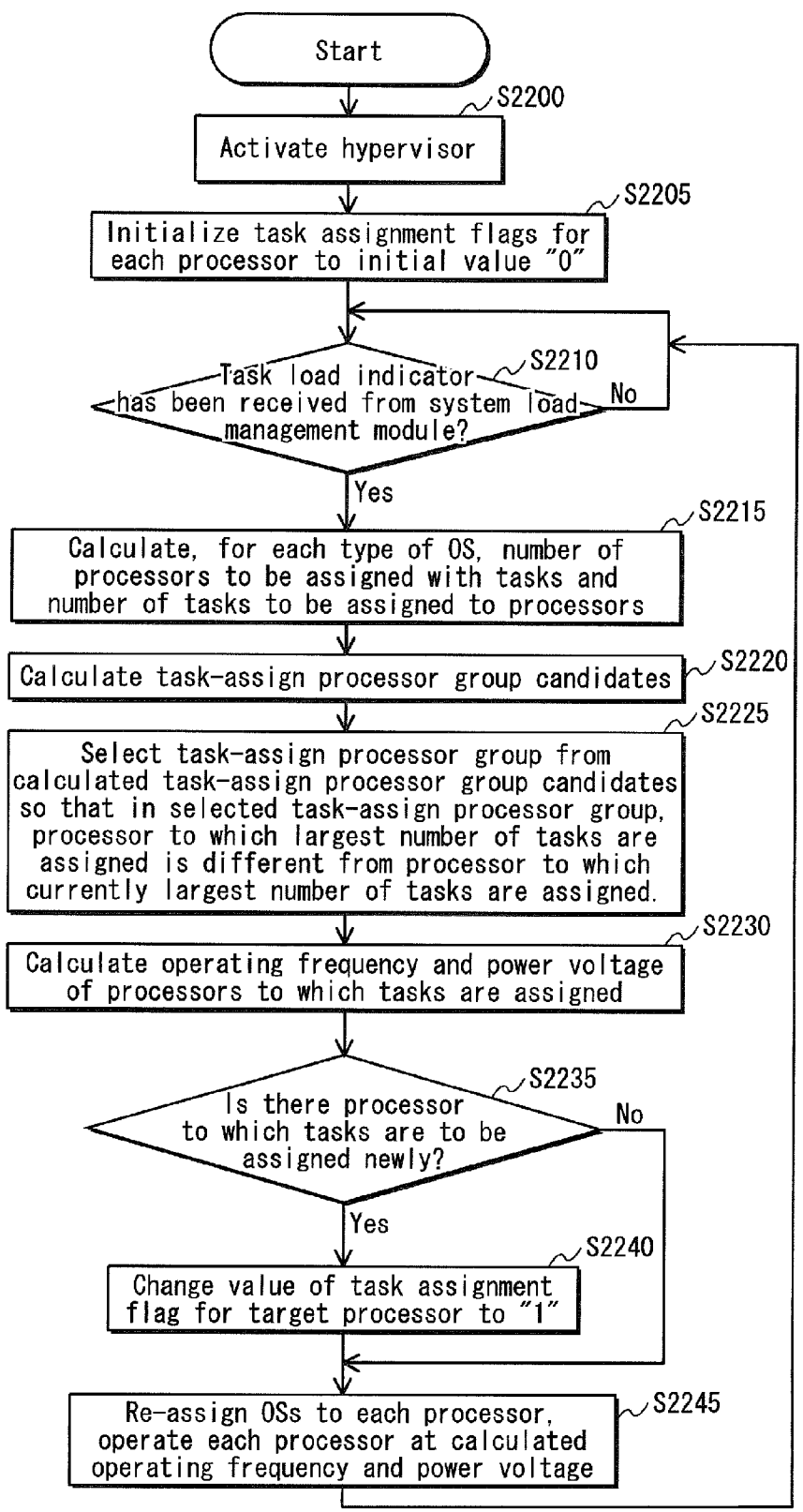
FIG. 22 is a flowchart of the modified processor selection process.

FIG. 22 is a flowchart of the modified processor selection process performed by the further modified multiprocessor system in Embodiment 3.

Steps S2200 through S2220 and steps S2230 through S2245 of this process correspond to steps S1900 through S1920 and steps S1930 through S1945 of the processor selection process in Embodiment 2, respectively (see FIG. 19). Also, the hypervisor 1431 is replaced with the hypervisor 2031, the system load management module 1432 is replaced with the system load management module 2032, and the processor selection module 1433 is replaced with the processor selection module 2033.

Accordingly, the description thereof is omitted here.

After the process of step S2220 is completed, the processor selection module 2033 selects a task-assign processor group that has the smallest difference in terms of a combination of processors belonging to a processor group and OSs assigned to the processors, from a processor group to which the tasks are currently assigned, so that in the selected task-assign processor group, a processor to which the largest number of tasks are assigned is different from the processor to which currently the largest number of tasks are assigned (step S2225).

After the process of step S2225 is completed, the further modified multiprocessor system performs the process of step S2230 and the subsequent steps.

<Specific Example>

FIG. 23 shows one example of the OS having been assigned to each processor and the number of tasks having been assigned thereto as of the predetermined times immediately before and after the hypervisor 2031 re-assigns tasks to processors (hereinafter the predetermined times are referred to as "time t1" and "time t2", respectively).

The upper part of FIG. 23 shows the OS having been assigned to each processor and the number of tasks having been assigned thereto as of time t1, and the lower part of FIG. 23 shows the OS having been assigned to each processor and the number of tasks having been assigned thereto as of time t2.

As of time t1, the processors to which the largest number of tasks have been assigned are the processor M 123 to which the $1^{st}$ OS and 80 tasks have been assigned, and the processor H 118 to which the $2^{nd}$ OS and 80 tasks have been assigned. On the other hand, as of time t2, the processors to which the largest number of tasks have been assigned are the processor L 122 to which the $1^{st}$ OS and 80 tasks have been assigned, and the processor G 117 to which the $2^{nd}$ OS and 80 tasks have been assigned.

In this way, as the hypervisor 2031 re-assigns tasks to processors, the processor to which the largest number of tasks are assigned changes. Therefore the same processor does not continue to be assigned with the largest number of tasks.

According to the above multiprocessor system, it is possible to re-assign tasks to processors so that a processor to which currently the largest number of tasks are assigned will not be a processor to which the largest number of tasks are assigned.

Thus it becomes possible to prevent the thermal runaway which would occur when the large number of tasks are assigned to the same processor for a long time period.

It is known that a larger amount of power is consumed when a processor at a high temperature executes a process than when a processor at a low temperature executes the process. It is also known that when a processor at a high temperature is continuously used to execute a process, the defect occurrence rate in the processor increases due to deterioration caused by the heat. However, the above multiprocessor system restricts the increase in the amount of power consumption due to increase in the temperature of the processor, and restricts the increase in the defect occurrence rate due to increase in the temperature of the processor.

<Supplementary Notes>

Up to now, three examples of multiprocessor systems have been explained through Embodiments 1, 2, and 3 as embodiments of the multiprocessor system of the present invention. However, the following modifications are also possible, and the present invention is not limited to the multiprocessor systems described in the above embodiments.

(1) In Embodiment 1, the multiprocessor LSI 100 is constituted from 25 processors that are arranged in a 5×5 matrix and the 25 processors have the same functions and same shape. However, the number of the processors does not need to be 25, the processors do not need to be arranged in a 5×5 matrix, the processors do not need to have the same functions, and the processors do not need to have the same shape in so far as the system includes three or more processors that can communicate with each other and not all of the processors are not directly connected with each other.

(2) In Embodiment 1, the $1^{st}$ OS 601 through $K^{th}$ OS 604 are OSs that are different from each other in type. However, in so far as the OSs operate on the hypervisor 631, the OSs may not necessarily be different from each other in type, but all or part of the OSs may be the same in type.

(3) In Embodiment 1, FIGS. 9A through 9F and FIG. 11 show examples of the operation pattern information. However, the operation pattern information is not limited to the examples thereof shown in FIGS. 9A through 9F and FIG. 11 in so far as it indicates that the OSs are assigned to the processors so that, when two processors among processors to which tasks are assigned are referred to as "$1^{st}$ processor" and "$2^{nd}$ processor" and the number of processors each assigned with one or more tasks and directly connected with the $2^{nd}$ processor is smaller than the number of processors each assigned with one or more tasks and directly connected with the $1^{st}$ processor, the amount of tasks assigned to the $1^{st}$ processor is equal to or larger than the amount of tasks assigned to the $2^{nd}$ processor.

(4) In Embodiment 1, as one example, the hypervisor 631 assigns OSs to processors based on the number of tasks assigned to each OS. However, the assignment of OSs to processors may not be performed based on the number of tasks assigned to each OS in so far as it is performed based on the amount of tasks assigned to each OS. For example, the assignment of OSs to processors may be performed based on the number of instruction steps included in the tasks, or the size of the data that is dealt with by the tasks.

A processor assigned with tasks that include a higher number of instruction steps is apt to perform a larger amount of communication with other processors assigned with tasks, than a processor assigned with tasks that include a lower number of instruction steps. Also, a processor assigned with tasks that deal with larger size of data is apt to perform a larger amount of communication with other processors assigned with tasks, than a processor assigned with tasks that deal with smaller size of data.

(5) Embodiment 1 provides an example in which all processors constituting the multiprocessor system are arranged in one semiconductor integrated circuit. However, all processors may not necessarily be arranged in one semiconductor integrated circuit in so far as the processors can communicate with each other. For example, the processors may be arranged in a plurality of semiconductor integrated circuits, or may not be arranged in a semiconductor integrated circuit at all.

(6) Embodiment 1 provides an example in which a plurality of processors are arranged in one plane. However, the processors may not necessarily be arranged in one plane in so far as the processors can communicate with each other.

Figure 24:
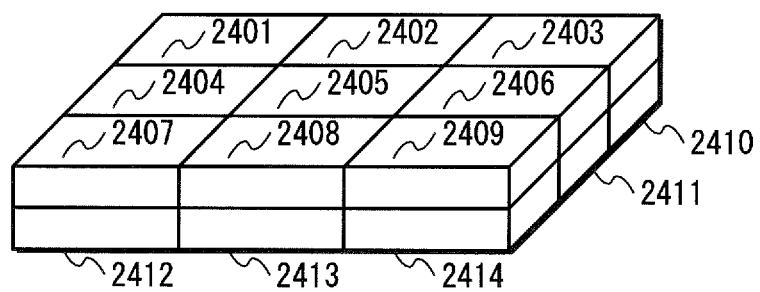
FIG. 24 illustrates an example in which 18 processors are arranged in a three-dimensional manner.

FIG. 24 illustrates an example in which 18 processors (processor 2401 through processor 2414) are arranged in a three-dimensional manner of 3×3×2.

As one example, a structure in which a plurality of processors are arranged in a three-dimensional manner as shown in FIG. 24 may be adopted.

(7) Embodiment 1 provides an example in which a processor, a local memory, and a cache memory included in each power block operate at the same combination of a clock signal and a power voltage. However, the processor, local memory, and cache memory included in each power block may not necessarily operate at the same combination of a clock signal and a power voltage in so far as the processor can use the local memory and the cache memory normally.

For example, the cache memory may be arranged in a power block which is different from a power block of the processor, and always operate at 100 MHz of operating frequency and 0.8 V of power voltage independent of the operating frequency and power voltage of the processor. Alternatively, the local memory may be arranged in a power block which is different from a power block of the processor, and operate at an operating frequency and a power voltage that are controlled independent of the processor.

(8) Embodiment 1 provides an example in which the external memory 440 is present outside the multiprocessor LSI 100. However, the external memory may be integrated in the multiprocessor LSI 100.

(9) Embodiment 1 provides an example in which the power voltage and the operating frequency for a processor are set in accordance with the number of tasks assigned to the processor. However, as an alternative to this, the operating frequency for a processor may be set in accordance with the number of tasks assigned to the processor, and the power voltage for the processor may be constant dependent of the number of tasks assigned to the processor. As another alternative, the power voltage and the operating frequency for a processor may be constant dependent of the number of tasks assigned to the processor.

(10) Embodiment 2 provides an example in which a processor group that has the smallest difference in terms of a combination of processors belonging to a processor group and OSs assigned to the processors, from a processor group to which tasks are currently assigned, is selected from among the task-assign processor group candidates, the processor group being selected as a task-assign processor group to which tasks are assigned. As an alternative to this, however, a processor group that has the smallest difference in terms of a combination of processors belonging to a processor group and power voltages of the processors, from a processor group to which tasks are currently assigned, may be selected. Also, as another alternative, a processor group that has the smallest difference in terms of a combination of processors belonging to a processor group and operating frequencies of the processors, from a processor group to which tasks are currently assigned, may be selected.

(11) Embodiment 2 provides an example in which three types of OSs operate on the hypervisor 1431. However, the number of the types of OSs may not necessarily be three.

(12) Embodiment 2 provides an example in which the task assignment flag holding module 1436 initializes the task assignment flags to the initial value "0" when the hypervisor 1431 is activated. However, the present invention does not need to be limited to the structure in which the task assignment flags are initialized to value "0" when the hypervisor 1431 is activated.

When no task is assigned to a processor for a long time, the data stored in the local memory or the cache memory corresponding to the processor might not be the latest data.

In view of this, for example, the task assignment flag holding module 1436 may set a task assignment flag to "0" when no task has been assigned to the corresponding processor for a predetermined time period (for example, 15 minutes).

(13) Embodiment 2 provides an example in which up to 80 tasks are assigned to each processor. However, the upper limit of the number of tasks to be assigned may be determined depending on the type of the tasks or the performance of the processors, and is not necessarily be 80, but may be 81 or more, or 79 or less.

(14) Embodiment 3 provides an example in which the further modified multiprocessor system performs re-assignment of tasks to the processors at every interval of a predetermined time period. However, the re-assignment of tasks may not necessarily be performed at every interval of a predetermined time period, but, for example, may be performed when a change in number of processing-target tasks is detected.

INDUSTRIAL APPLICABILITY

The present invention can be used broadly in information processing devices which are each provided with a plurality of processors.

REFERENCE SIGNS LIST

651 $1^{st}$ task
652 $2^{nd}$ task
653 $3^{rd}$ task
654 $4^{th}$ task
655 $N^{th}$ task
601 $1^{st}$ OS
602 $2^{nd}$ OS
603 $3^{rd}$ OS
604 $K^{th}$ OS
631 hypervisor
632 OS task correspondence information holding module
633 processor selection module
634 voltage frequency information holding module
635 operation pattern information holding module

The invention claimed is:

1. A multiprocessor system comprising:
a processor array composed of three or more processors that are arranged in a matrix and communicating with each other, wherein each pair of adjacent processors in the matrix are connected to each other such that the adjacent processors can communicate with each other without performing a routing process for any other processors in the matrix, and each respective processor of the three or more processors in the matrix is connected to a processor that is not adjacent to the respective processor such that the respective processor and the processor that is not adjacent to the respective processor can communicate with each other by performing a routing process for at least one of the processors that are adjacent to the respective processor; and
a task management unit operable to select three or more of said processors of the processor array as respective three or more task-assigned processors for processing a group of tasks, and determine an amount of tasks to be assigned to each of the said task-assigned processors based on a number of processors adjacent in the matrix to that task-assigned processor, wherein
the three or more task-assigned processors includes a first task-assigned processor and a second task-assigned processor,
the task management unit determines the amount of tasks to be assigned to each of said task-assigned processors based on a number of adjacent task-assigned processors in the matrix to the respective said task-assigned processors, wherein an amount of tasks assigned to the first task-assigned processor is larger than an amount of tasks assigned to the second task-assigned processor when a number of task-assigned processors adjacent in the matrix to the first task-assigned processor is greater than a number of task-assigned processors adjacent in the matrix to the second task-assigned processor, and
the task management unit assigns tasks to each of said task-assigned processors according to the determining.

2. The multiprocessor system of claim 1, further comprising:
an operating frequency determining unit operable to determine an operating frequency of each processor in accordance with the amount of tasks assigned to each processor by the task management unit; and
an operation control unit operable to cause each processor to operate at the operating frequency determined by the operating frequency determining unit, wherein
the operating frequency determining unit determines operating frequencies such that an operating frequency of the first task-assigned processor is equal to or higher than an operating frequency of the second task-assigned processor.

3. The multiprocessor system of claim 2, further comprising:
an operating voltage determining unit operable to, when it is found, based on the operating frequencies determined by the operating frequency determining unit, that there are a processor operating at the first operating frequency and a processor operating at the second operating frequency which is lower than the first operating frequency, determine operating voltages of each processor such that an operating voltage of the processor operating at the first operating frequency is equal to or higher than an operating voltage of the processor operating at the second operating frequency; and
a voltage supply unit operable to supply the operating voltages determined by the operating voltage determining unit to each processor.

4. The multiprocessor system of claim 2, wherein
the operating frequency determining unit determines the operating frequencies such that, when there is a processor to which no task is assigned, an operating frequency of the processor to which no task is assigned is 0 hertz.

5. The multiprocessor system of claim 1, further comprising:
a storage unit storing connection information reflecting connection relationships between processors, wherein
the task management unit assigns tasks, which are to be processed by the processors, to the processors by referring to the connection information stored in the storage unit.

6. The multiprocessor system of claim 1, wherein:
in a predetermined case, the task management unit determines the amount of tasks to be assigned such that a processor that currently has the largest amount of tasks is not to be assigned as the processor having the largest amount of tasks when the tasks are assigned next.

7. The multiprocessor system of claim 6, wherein:
the predetermined case is a case where a predetermined time is passed.

8. The multiprocessor system of claim 6, wherein:
the predetermined case is a case when a change in number of processing-target tasks is detected.

9. The multiprocessor system of claim 1, wherein:
the task management unit selects the three or more task-assigned processors such that at least two of the task-assigned processors are processors that are directly connected to each other.

10. The multiprocessor system of claim 1, wherein:
the amount of tasks is the number of tasks.

11. The multiprocessor system of claim 1, wherein:
all processors included in the multiprocessor system have the same shape and are arranged in a matrix in at least one semiconductor integrated circuit.

12. The multiprocessor system of claim 1, wherein:
all processors included in the multiprocessor system are arranged in a three-dimensional manner.

13. A multiprocessor control method for controlling a multiprocessor system including a processor array composed of three or more processors that are arranged in a matrix and communicating with each other, wherein each pair of adjacent processors in the matrix are connected to each other such that the adjacent processors can communicate with each other without performing a routing process for any other processors in the matrix, and each respective processor of the three or more processors in the matrix is connected to a processor that is not adjacent to the respective processor such that the respective processor and the processor that is not adjacent to the respective processor can communicate with each other by performing a routing process for at least one of the processors that are adjacent to the respective processor; and a task management unit, said method comprising:

selecting, by the task management unit, three or more of the processors of the processor array as respective three or more task-assigned processors for processing a group of tasks, and determining, by the task management unit, an amount of tasks to be assigned to each of said task-assigned processors based on a number of processors adjacent in the matrix to that task-assigned processor, wherein the three or more task-assigned processors includes a first task-assigned processor and a second task-assigned processor, wherein said determining of the amount of tasks to be assigned to each of said task-assigned processors is performed based on a number of adjacent task-assigned processors in the matrix to the respective said task-assigned processors, wherein an amount of tasks assigned to the first task-assigned processor is larger than an amount of tasks assigned to the second task-assigned processor when a number of task-assigned processors adjacent in the matrix to the first task-assigned processor is greater than a number of task-assigned processors adjacent in the matrix to the second task-assigned processor, and assigning, by the task management unit, tasks to each of said task-assigned processors according to said determining.

14. A multiprocessor integrated circuit comprising:
a processor array composed of three or more processors that are arranged in a matrix and communicating with each other, wherein each pair of adjacent processors in the matrix are connected to each other such that the adjacent processors can communicate with each other without performing a routing process for any other processors in the matrix, and each respective processor of the three or more processors in the matrix is connected to a processor that is not adjacent to the respective processor such that the respective processor and the processor that is not adjacent to the respective processor can communicate with each other by performing a routing process for at least one of the processors that are adjacent to the respective processor; and a task management unit operable to select three or more of said processors of the processor array as respective three or more task-assigned processors for processing a group of tasks, and determine an amount of tasks to be assigned to each of said task-assigned processors based on a number of processors adjacent in the matrix to that task-assigned processor, wherein the three or more task-assigned processors includes a first task-assigned processor and a second task-assigned processor, the task management unit determines the amount of tasks to be assigned to each of said task-assigned processors based on a number of adjacent task-assigned processors in the matrix to the respective said task-assigned processors, wherein an amount of tasks assigned to the first task-assigned processor is larger than an amount of tasks assigned to the second task-assigned processor when a number of task-assigned processors adjacent in the matrix to the first task-assigned processor is greater than a number of task-assigned processors adjacent in the matrix to the second task-assigned processor, and the task management unit assigns tasks to each of said task-assigned processors according to the determining.

* * * * *